(12) United States Patent
Taber et al.

(10) Patent No.: US 11,954,233 B2
(45) Date of Patent: *Apr. 9, 2024

(54) CHAINING, TRIGGERING, AND ENFORCING ENTITLEMENTS

(71) Applicant: MICROSOFT TECHNOLOGY LICENSING, LLC, Redmond, WA (US)

(72) Inventors: Yisroel Gershon Taber, Redmond, WA (US); Tomer Turgeman, Redmond, WA (US); Ittay Levy Ophir, Redmond, WA (US); Lev Rozenbaum, Redmond, WA (US); Nerya Cohen, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/743,341

(22) Filed: May 12, 2022

(65) Prior Publication Data

US 2022/0277105 A1 Sep. 1, 2022

Related U.S. Application Data

(63) Continuation of application No. 17/009,414, filed on Sep. 1, 2020, now Pat. No. 11,361,106.

(51) Int. Cl.
*G06F 21/00* (2013.01)
*G06F 9/38* (2018.01)
(Continued)

(52) U.S. Cl.
CPC ........ *G06F 21/6254* (2013.01); *G06F 9/3836* (2013.01); *G06F 21/6272* (2013.01); *G06F 21/645* (2013.01)

(58) Field of Classification Search
CPC ............... G06F 21/6254; G06F 9/3836; G06F 21/6272; G06F 21/645
See application file for complete search history.

(56) References Cited

U.S. PATENT DOCUMENTS

| | | |
|---|---|---|
| 5,907,692 A | 5/1999 | Wise et al. |
| 8,346,870 B2 | 1/2013 | Jazdzewski |

(Continued)

FOREIGN PATENT DOCUMENTS

| | | |
|---|---|---|
| CN | 110210211 A | 9/2019 |
| WO | 2010129432 A2 | 11/2010 |

OTHER PUBLICATIONS

Behl et al., "An analysis of cloud computing security issues", An analysis of cloud computing security issues, (Year: 2012).*

(Continued)

*Primary Examiner* — Morshed Mehedi
(74) *Attorney, Agent, or Firm* — Shook, Hardy & Bacon L.L.P.

(57) ABSTRACT

Embodiments are directed to techniques for chaining, triggering, and/or enforcing entitlements in a constrained environment. A constrained environment may be provided within with shielded assets are required to exist or execute. An entitlement may be granted on a variety of shielded assets, including datasets, computations scripts, data privacy pipelines, and intermediate datasets generated by an intermediate step of a data privacy pipeline. Thus, a beneficiary may use a granted entitlement as an input into other data privacy pipelines, without the need for the grantor to approve each specific downstream operation. The constrained environment may enforce an entitlement by fulfilling applicable constraints upon accessing the entitlement, restricting the output of the entitlement to the constrained environment, and fulfilling applicable policies when executing downstream operations. Data may be exported from the (Continued)

constrained environment when the data consumer seeking to export has sufficient ownership rights or export permission and applicable policies are fulfilled.

20 Claims, 11 Drawing Sheets

(51) Int. Cl.
  *G06F 21/62* (2013.01)
  *G06F 21/64* (2013.01)

(56) References Cited

U.S. PATENT DOCUMENTS

| | | | |
|---|---|---|---|
| 8,613,070 | B1 | 12/2013 | Deva et al. |
| 8,621,649 | B1 | 12/2013 | Van Dijk et al. |
| 10,496,653 | B1 | 12/2019 | Epshteyn et al. |
| 10,642,832 | B1* | 5/2020 | Neumann ............ G06F 40/166 |
| 2005/0154729 | A1 | 7/2005 | Gutsche |
| 2006/0282281 | A1 | 12/2006 | Egetoft |
| 2009/0282045 | A1* | 11/2009 | Hsieh .................... H04L 63/104 |
| | | | 707/999.009 |
| 2010/0287562 | A1 | 11/2010 | Jazdzewski |
| 2011/0085667 | A1 | 4/2011 | Berrios |
| 2013/0239228 | A1 | 9/2013 | Cinarkaya et al. |
| 2013/0247204 | A1 | 9/2013 | Schrecker et al. |
| 2015/0317490 | A1 | 11/2015 | Carey et al. |
| 2017/0169253 | A1 | 6/2017 | Curcio et al. |
| 2017/0185752 | A1 | 6/2017 | Lemay et al. |
| 2017/0235645 | A1* | 8/2017 | Theimer ............ G06F 21/6218 |
| | | | 707/634 |
| 2018/0032576 | A1* | 2/2018 | Romero ................ G06F 21/31 |
| 2018/0053012 | A1* | 2/2018 | Myers ................ G06F 12/1408 |
| 2018/0129585 | A1 | 5/2018 | Martin et al. |
| 2018/0157928 | A1 | 6/2018 | Oliveira et al. |
| 2018/0203701 | A1 | 7/2018 | Nield et al. |
| 2018/0210936 | A1* | 7/2018 | Reynolds .............. G06F 40/169 |
| 2018/0239639 | A1 | 8/2018 | Novak et al. |
| 2018/0262864 | A1 | 9/2018 | Reynolds et al. |
| 2019/0213346 | A1* | 7/2019 | Friedman ............ G06F 21/6218 |
| 2019/0236598 | A1* | 8/2019 | Padmanabhan ...... G06Q 20/389 |
| 2019/0303115 | A1 | 10/2019 | Kelly et al. |
| 2019/0318198 | A1 | 10/2019 | Griffin et al. |
| 2020/0173004 | A1 | 6/2020 | Fujiwara et al. |
| 2020/0252210 | A1 | 8/2020 | Sharfman et al. |
| 2020/0265057 | A1 | 8/2020 | Jolfaei |
| 2021/0081432 | A1 | 3/2021 | Grunwald et al. |
| 2021/0096936 | A1 | 4/2021 | Seshadri et al. |
| 2022/0121555 | A1 | 4/2022 | Zbiciak et al. |
| 2022/0215119 | A1 | 7/2022 | Turgeman et al. |
| 2022/0215120 | A1 | 7/2022 | Turgeman et al. |
| 2022/0215121 | A1 | 7/2022 | Turgeman et al. |
| 2022/0215122 | A1 | 7/2022 | Turgeman et al. |
| 2022/0215123 | A1 | 7/2022 | Turgeman et al. |
| 2022/0215124 | A1 | 7/2022 | Turgeman et al. |
| 2022/0215125 | A1 | 7/2022 | Turgeman et al. |
| 2022/0398338 | A1 | 12/2022 | Turgeman et al. |
| 2023/0280986 | A1 | 9/2023 | Taber et al. |
| 2023/0281109 | A1 | 9/2023 | Taber et al. |
| 2023/0281342 | A1 | 9/2023 | Taber et al. |

OTHER PUBLICATIONS

Xia et al., "MeDShare: Trust-Less Medical Data Sharing Among Cloud Service Providers via Blockchain", Digital Object Identifier 10.1109/ACCESS.2017.2730843, Received Jun. 21, 2017, accepted Jul. 11, 2017, date of publication Jul. 24, 2017, date of current version Aug. 14, (Year: 2017).*
"Non Final Office Action Issued in U.S. Appl. No. 17/009,407", dated Nov. 17, 2022, 21 Pages.
"Notice of Allowance Issued in U.S. Appl. No. 16/388,696", dated May 23, 2022, 10 Pages.
"Notice of Allowance Issued in U.S. Appl. No. 16/736,399", dated Mar. 30, 2022, 6 Pages.
Montori, et al., "A Collaborative Internet of Things Architecture for Smart Cities and Environmental Monitoring", In Internet of Things Journal, vol. 5, Issue 2, Apr. 2018, pp. 592-605.
U.S. Appl. No. 17/743,341, filed May 12, 2022.
U.S. Appl. No. 17/656,051, filed Mar. 23, 2022.
U.S. Appl. No. 17/656,057, filed Mar. 23, 2022.
U.S. Appl. No. 17/656,062, filed Mar. 23, 2022.
U.S. Appl. No. 17/656,066, filed Mar. 23, 2022.
U.S. Appl. No. 17/656,073, filed Mar. 23, 2022.
U.S. Appl. No. 17/656,079, filed Mar. 23, 2022.
U.S. Appl. No. 17/656,082, filed Mar. 23, 2022.
"Notice of Allowance Issued in U.S. Appl. No. 17/009,407", dated Apr. 18, 2023, 8 Pages.
"International Search Report and Written Opinion Issued in PCT Application No. PCT/US22/054022", dated Apr. 28, 2023, 12 Pages.
"International Search Report and Written Opinion Issued in PCT Application No. PCT/US23/010524", dated May 9, 2023, 11 Pages.
"International Search Report and Written Opinion Issued in PCT Application No. PCT/US23/011487", dated May 4, 2023, 13 Pages.
"Office Action Issued in European Patent Application No. 20719528.0", dated Apr. 5, 2023, 5 Pages.
"Non Final Office Action Issued in U.S. Appl. No. 17/656,051", dated Aug. 24, 2023, 37 Pages.
"Non Final Office Action Issued in U.S. Appl. No. 17/656,073", dated Sep. 19, 2023, 32 Pages.
"Non Final Office Action Issued in U.S. Appl. No. 17/684,204", dated Sep. 14, 2023, 10 Pages.
"Notice of Allowance Issued in U.S. Appl. No. 17/684,210", dated Aug. 9, 2023, 12 Pages.
"Office Action Issued in Indian Patent Application No. 202117044993", dated Aug. 3, 2023, 7 Pages.
"Office Action Issued in European Patent Application No. 20718931.7", dated Sep. 5, 2023, 9 Pages.
"Office Action Issued in European Patent Application No. 20719254.3", dated Sep. 6, 2023, 11 Pages.
"Office Action Issued in European Patent Application No. 20721859.5", dated Sep. 7, 2023, 8 Pages.
"Office Action Issued in European Patent Application No. 20722753.9", dated Sep. 7, 2023, 7 Pages.
Brachmann, et al., "Data Debugging and Exploration with Vizier", In Proceedings of the International Conference on Management of Data, Jun. 30, 2019, pp. 1877-1880.
Chen, et al., "Enrichr: Interactive and Collaborative HTML5 Gene List Enrichment Analysis Tool", In Journal of BMC Bioinformatics, vol. 14, Issue 1, Apr. 15, 2013, pp. 1-14.
Dimitrova, et al., "Authorization-Aware Optimization for Multi-Provider Queries", In Proceedings of the 34th ACM/SIGAPP Symposium on Applied Computing, Apr. 8, 2019, pp. 431-438.
Hellerstein, et al., "Ground: A Data Context Service", In Proceedings of 8th Biennial Conference on Innovative Data Systems Research, Jan. 8, 2017, 12 Pages.
Liu, et al., "Mona: Secure Multi-Owner Data Sharing for Dynamic Groups in the Cloud", In Journal of IEEE Transactions on Parallel and Distributed Systems, vol. 24, Issue 6, Jun. 2013, pp. 1182-1191.
Rezig, et al., "Debugging Large-Scale Data Science Pipelines using Dagger", In Proceedings of the VLDB Endowment, vol. 13, Issue 12, Aug. 1, 2020, pp. 2993-2996.
"Office Action Issued in Indian Patent Application No. 202117045000", dated Sep. 21, 2023, 8 Pages.
"Non-Final Office Action Issued in U.S. Appl. No. 17/656,079", dated Oct. 10, 2023, 31 Pages.
Batini, et al., "Methodologies for Data Quality Assessment and Improvement", In Journal of ACM Computing Surveys, vol. 41, Issue 3, Jul. 30, 2009, pp. 1-52.
U.S. Appl. No. 16/388,700 | US-2020-0334259-A1, filed Apr. 18, 2019, | Oct. 22, 2022.
U.S. Appl. No. 16/388,703 | US-2020-0334375-A1, filed Apr. 18, 2019 | Oct. 22, 2022.
U.S. Appl. No. 16/388,696 | US-2020-0334370-A1, filed Apr. 18, 2019 | Oct. 22, 2020.

(56) References Cited

OTHER PUBLICATIONS

U.S. Appl. No. 16/665,916 | US-2020-0334377-A1, filed Oct. 28, 2019 | Oct. 22, 2022.
U.S. Appl. No. 16/736,399 | US-2020-0336488-A1 | U.S. Pat. No. 11,356,456, filed Jan. 7, 2022 | Oct. 22, 2020 | Jun. 7, 2022.
U.S. Appl. No. 17/009,407 | US-2022-0067199-A1, filed Sep. 1, 2020 | Mar. 3, 2022.
U.S. Appl. No. 17/009,414 | US-2022-0067200-A1 | U.S. Pat. No. 11,361,106, filed Sep. 1, 2020 | Mar. 3, 2022 | Jun. 14, 2022.
U.S. Appl. No. 17/887,989, filed Aug. 15, 2022.
U.S. Appl. No. 17/684,204, filed Mar. 1, 2022.
U.S. Appl. No. 17/684,189, filed Mar. 1, 2022.
U.S. Appl. No. 17/684,210, filed Mar. 1, 2022.
U.S. Appl. No. 17/656,051 | US-2022-0215119-A1, filed Mar. 23, 2022 | Jul. 7, 2022.
U.S. Appl. No. 17/656,057 | US-2022-0215120-A1, filed Mar. 23, 2022 | Jul. 7, 2022.
U.S. Appl. No. 17/656,062 | US-2022-0215121-A1, filed Mar. 23, 2022 | Jul. 7, 2022.
U.S. Appl. No. 17/656,066 | US-2022-0215122-A1, filed Mar. 23, 2022 | Jul. 7, 2022.
U.S. Appl. No. 17/656,073 | US-2022-0215123-A1, filed Mar. 23, 2022 | Jul. 7, 2022.
U.S. Appl. No. 17/656,079 | US-2022-0215124-A1, filed Mar. 23, 2022 | Jul. 7, 2022.
U.S. Appl. No. 17/656,082 | US-2022-0215125-A1, filed Mar. 23, 2022 | Jul. 7, 2022.
Notice of Allowance dated Dec. 27, 2023, in U.S. Appl. No. 17/684,204, 7 pages.
"Non Final Office Action Issued in U.S. Appl. No. 17/656,082", dated Oct. 27, 2023, 36 Pages.
"Office Action Issued in European Patent Application No. 20719528.0", dated Oct. 25, 2023, 6 Pages.
"Non Final Office Action Issued in U.S. Appl. No. 17/656,057", dated Nov. 13, 2023, 35 Pages.

* cited by examiner

CHAINING, TRIGGERING, AND ENFORCING ENTITLEMENTS

CROSS-REFERENCE TO RELATED APPLICATION

This application is a continuation of and claims priority to U.S. patent application Ser. No. 17/009,414, filed on Sep. 1, 2020, the entire contents of which are incorporated by reference in their entirety.

BACKGROUND

Businesses and technologies increasingly rely on data. Many types of data can be observed, collected, derived, and analyzed for insights that inspire progress in science and technology. In many cases, valuable intelligence can be derived from datasets, and useful products and services can be developed based on that intelligence. This type of intelligence can help advance industries such as banking, education, government, health care, manufacturing, retail, and practically any other industry. However, in many cases, the datasets owned or available to a particular data owner are incomplete or limited in some fundamental way. Information sharing is one way to bridge gaps in datasets, and sharing data has become an increasingly common practice. There are many benefits from sharing data. However, there are also many concerns and obstacles.

SUMMARY

Embodiments of the present disclosure are directed to techniques for chaining, triggering, and/or enforcing entitlements in a constrained environment. At a high level, a constrained environment (e.g. a data trustee environment, or portion thereof) may be provided within with shielded assets are required to exist or execute. For example, the constrained environment may enforce an entitlement by restricting the output of the entitlement (e.g., an aggregated dataset) to the constrained environment, identifying the restricted entitlement output as an intermediate dataset, and executing downstream operations that are consistent with the entitlement. Thus, a beneficiary may use a granted entitlement as an input into a data privacy pipeline, without the need for the grantor to approve each specific downstream operation.

Another way that a constrained environment can provide flexibility to grant access to a particular shielded asset for an unspecified downstream use is to allow an authorized participant to a data privacy pipeline to build off of an intermediate dataset generated by an intermediate step of a data privacy pipeline. More specifically, an entitlement may be granted on the intermediate dataset, a beneficiary may build off the entitlement, and the constrained environment may enforce the entitlement by executing downstream operations that are consistent with the entitlement.

Generally, a constrained environment may enforce an entitlement by fulfilling applicable constraints upon accessing the entitlement and fulfilling applicable policies when executing downstream operations. Data such as an intermediate dataset may be exported from the constrained environment when the particular data consumer seeking to export has sufficient ownership rights or export permission and any applicable policies have been fulfilled. As such, data privacy pipelines may be built by chaining one or more entitlements into a pipeline of computational steps, and pipelines with entitlements may be triggered and enforced in a constrained environment.

Because entitlement outputs and intermediate datasets from data privacy pipelines may be chained together, it is possible that a downstream entitlement may be granted to a beneficiary who is not party to a collaborative intelligence contract governing access to an upstream shielded asset (e.g., an input dataset, data privacy pipeline). As such, when a data consumer requests to trigger a pipeline or other computation that relies on any entitlements (e.g., a data privacy pipeline that builds off an entitlement, a data privacy pipeline for which access to the pipeline itself has been delegated via an entitlement), prior to triggering the requested pipeline or other computation, an enforcement mechanism may operate to verify whether the data consumer's triggering of the requested pipeline or computation would satisfy the entitlements.

More specifically, a rules engine may access all root entities of the pipeline that require an entitlement, load all contracts and/or corresponding pipelines that reference one of the root entities, and search for one valid access path through the loaded contracts/pipelines. To accomplish this, the rules engine may advance through the steps of each pipeline, verifying any constraints and policies that are applicable to each step. If only one contract allows access to a particular root entity through a single access path, the rules engine may designate the access path for use. If multiple contracts and/or multiple access paths allow access to a particular root entity, various conflict rules may be configured to choose which contract and access path to use. If all root entities have a valid access path, the constrained environment may execute the requested pipeline or computation using the identified access path for each root entity.

As such, entitlements may be chained, triggered, and/or enforced in a constrained environment. Whether an entitlement is granted on a dataset, an output of a data privacy pipeline, or an intermediate dataset generated by an intermediate step of a data privacy pipeline, the output of the entitlement may be restricted to the constrained environment and assigned an identifier. As a result, an owner of a shielded asset may grant a beneficiary an entitlement to use the shielded asset in the constrained environment, subject to specified constraints upon access and policies applied upon downstream use, without exposing the shielded asset and without requiring the grantor to explicitly authorize every downstream use. Thus, authorized beneficiaries can build pipelines and other computations that make use of any number of entitlements within the constrained environment, without the need for the grantors of the entitlements to participate in building downstream pipelines and other computations.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Figure 1:
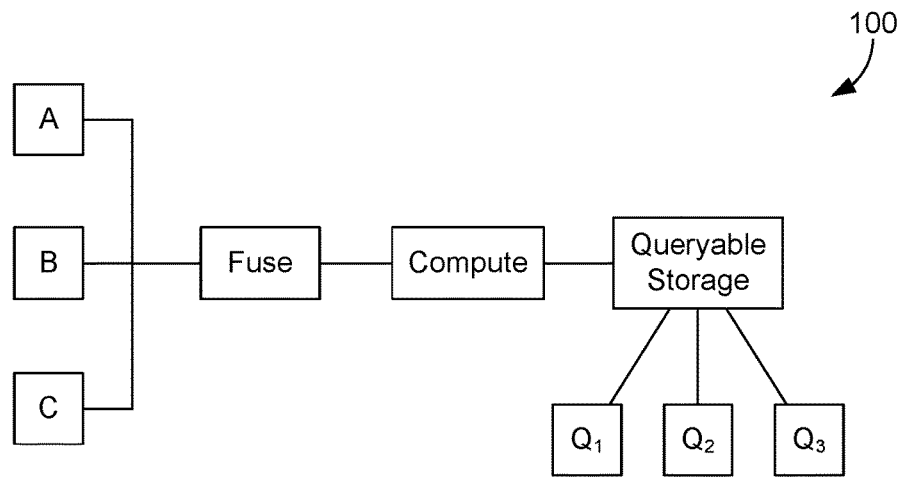
FIG. 1 is a block diagram of an example multi-participant pipeline, in accordance with embodiments described herein.

There are many benefits from sharing data. For example, sharing data often leads to more complete datasets, encourages collaborative efforts, and produces better intelligence (e.g., understanding or knowledge of an event or circumstance, or information, relationships, and facts about different types of entities). Researchers benefit from more data being available. Further, sharing can stimulate interest in research and can incentivize the production of higher data quality. Generally, sharing can result in synergies and efficiencies in research and development.

However, there are also many concerns and obstacles to sharing data. As a practical matter, different industries vary in ability and willingness to share data. Issues with data privacy and confidentiality are fundamental to many industries such as health care and banking. In many cases, laws, regulations, and consumer demands place restrictions on the ability to share data. Furthermore, the act of observing, collecting, deriving, and analyzing datasets is often an expensive and labor-intensive exercise, and many have concerns that sharing data would give away a competitive advantage. Even when there is sufficient motivation to share data, issues with control and access to shared data are often an obstacle to sharing. In effect, the obstacles often prevent data sharing and the opportunities for progress that come with it. As such, there is a need for data sharing techniques that facilitate development of collaborative intelligence while ensuring data privacy and facilitating control and access to shared data.

Accordingly, embodiments of the present disclosure are directed to techniques for sharing and using shielded assets that are required to exist or execute within a data trustee environment. At a high level, a data trustee can operate a trustee environment configured to derive collaborative intelligence for tenants subject to configurable constraints, without exposing underlying raw data provided by the tenants. By relying on trustee computing to perform data processing, tenants can derive collaborative data from each other's data without compromising data privacy. To accomplish this, the trustee environment can include one or more data privacy pipelines that are required to execute within the data trustee environment and through which data can be ingested, fused, derived, and/or sanitized to generate collaborative data. Generally, collaborative data refers to data that has been derived from input data from any number of sources (e.g., different users or tenants). The input data can be processed through any number of computational steps of a data privacy pipeline executing in the data trustee environment to generate collaborative data. A data privacy pipeline can be thought of as a template or a pattern that can be triggered and spun up in the data trustee environment by an authorized participant. As such, a data privacy pipeline can generate collaborative data from data provided by one or more tenants, and provide agreed-upon access to the collaborative data without sharing the underlying raw data with all the tenants.

Prior applications described how participants can collaborate to build a collaborative intelligence contract that specifies a configuration of a data privacy pipeline. Instead of requiring multiple participants to a data privacy pipeline to agree upon a full pipeline, equivalent computations can be implemented, authorized, and/or triggered in other ways. For example, an owner of a shielded asset (e.g., dataset, script) or other authorized participant can build a collaborative intelligence contract that grants an entitlement for another participant to use the shielded asset within a data trustee environment, subject to any designated entitlement constraints and/or policies. Thus, an entitlement may grant access to a designated shielded asset for unspecified downstream uses within the data trustee environment. For example, a data contributor may want to provide access to its data (or some other shielded asset), but may not want to be involved in the approval and enforcement of complex pipelines that use its data. In this case, the data contributor can grant an entitlement to a particular beneficiary to access and/or use its data, subject to designated entitlement constraints and/or policies. With the granted entitlement, the beneficiary can then use this data in its own pipelines, subject to any entitlement constraints and/or policies designated by the data contributor.

The present application describes techniques in which entitlement outputs may be chained, triggered, and/or enforced in a constrained environment. At a high level, a constrained environment (e.g. a data trustee environment, or portion thereof) may be provided within with shielded assets are required to exist or execute. For example, the constrained environment may enforce an entitlement by restricting the output of the entitlement (e.g., an aggregated dataset) to the constrained environment, identifying the restricted entitlement output as an intermediate dataset, and executing downstream operations that are consistent with the entitlement. Thus, a beneficiary may use a granted entitlement as an input into a data privacy pipeline, without the need for the grantor to approve each specific downstream operation. Another way that a constrained environment can provide flexibility to grant access to a particular shielded asset for an unspecified downstream use is to allow an authorized participant to a data privacy pipeline to build off of an intermediate dataset generated by an intermediate step of a data privacy pipeline. More specifically, an entitlement may be granted on the intermediate dataset, a beneficiary may build off the entitlement, and the constrained environment may enforce the entitlement by executing downstream operations that are consistent with the entitlement. Generally, a constrained environment may enforce an entitlement by fulfilling applicable constraints upon accessing the entitlement and fulfilling applicable policies when executing downstream operations. Data such as intermediate dataset (whether from an entitlement output or generated by a data privacy pipeline) may be exported from the constrained environment when the particular data consumer seeking to export has sufficient ownership rights or export permission and any applicable policies have been fulfilled. As such, data privacy pipelines may be built by chaining one or more entitlements into a pipeline of computational steps, and pipelines with entitlements may be triggered and enforced in a constrained environment.

More specifically, an owner of a particular shielded asset (e.g., dataset, computational script), or some other authorized participant, can build a collaborative intelligence contract and/or an entitlement that grants access to the shielded asset for unspecified downstream uses within a constrained environment, subject to defined constraints and/or policies. For example, a contractual agreement to share data may designate an entitlement output, or an output of an intermediate step in a data privacy pipeline, as an intermediate dataset required to exist within the constrained environment. The intermediate dataset may be identified (e.g., with a unique ID), ownership may be assigned or otherwise determined, and downstream uses of the intermediate dataset within the constrained environment may be authorized, subject to defined policies. Whether an intermediate dataset comes from an entitlement output or an intermediate step from a data privacy pipeline, new entitlements can be created governing downstream uses of the intermediate dataset, subject to defined constraints and/or policies. Thus, intermediate data from various sources (e.g., entitlements and/or data privacy pipelines) may be chained in various ways to form more flexible pipelines (e.g., multi-participant pipelines, such as multi-tenant pipelines) that are required to execute within the constrained environment, without requiring the grantor to approve each downstream use.

Generally, an identified intermediate dataset may be exported from the constrained environment when the particular data consumer seeking to export has sufficient ownership rights and any applicable policies have been fulfilled. In terms of ownership rights, participants to a collaborative intelligence contract may specify explicit ownership of an intermediate dataset (whether an entitlement output or an output generated by an intermediate step of a data privacy pipeline) via policies associated with the contract. Absent specified ownership rules, intermediate datasets generated by a data privacy pipeline may be considered to be owned and exportable by any participant to the pipeline (e.g., party to the governing contract). Thus, if a particular data consumer with ownership rights to an intermediate dataset requests to export the intermediate dataset (or a portion thereof) from the constrained environment, and any applicable policies can be fulfilled, the constrained environment may enforce the policies and export the intermediate dataset.

Because entitlement outputs and intermediate datasets from data privacy pipelines may be chained together, it is possible a downstream entitlement may be granted to a beneficiary who is not party to a collaborative intelligence contract governing access to an intermediate dataset or other upstream shielded asset. As a result, it is possible that a particular data consumer may be granted an entitlement to use an intermediate dataset for which the data consumer does not have ownership rights. If a particular data consumer seeking to export does not have sufficient ownership rights, or there are applicable policies that cannot be satisfied, the intermediate dataset may be restricted to the constrained environment, and the export request may be denied. However, in some embodiments, the intermediate dataset may nevertheless be used within the constrained environment, subject to any applicable policies. As such, requested downstream uses of an intermediate dataset within the constrained environment determined to be consistent with the entitlement governing use of the intermediate dataset may be authorized, and any applicable policies may be enforced by the constrained environment.

Furthermore, because entitlement outputs and intermediate datasets from data privacy pipelines may be chained together, it is possible a downstream entitlement may be granted to a beneficiary who is not party to a collaborative intelligence contract governing access to an upstream shielded asset (e.g., an input dataset, data privacy pipeline). For example, assume party A grants beneficiary B an entitlement to trigger party A's pipeline. However, party A's pipeline may build off of shielded assets (e.g., input datasets) owned by a number of other parties. For example, party A's pipeline may be a pipeline with multiple participants that each contributed data. In another example, party A's pipeline may build off a shielded asset (e.g., an input dataset) governed by an entitlement granted to party A by party C. Thus, beneficiary B may have been delegated access use various shielded assets governed by agreements where B is not a party and/or governed by entitlements that were not originally granted to B.

As such, when a data consumer requests to trigger a pipeline or other computation that relies on any entitlements (e.g., a data privacy pipeline that builds off an entitlement, a data privacy pipeline for which access to the pipeline itself has been delegated via an entitlement), prior to triggering the requested pipeline or other computation, an enforcement mechanism may operate to verify whether the data consumer's triggering of the requested pipeline or computation would satisfy the entitlements (i.e., constraints/policies defined by the entitlements). More specifically, a rules engine may access all root entities of the pipeline that require an entitlement, load all contracts and/or corresponding pipelines that reference one of the root entities, and search for one valid access path through the loaded contracts/pipelines. To accomplish this, the rules engine may advance through the steps of each pipeline, verifying any constraints and policies that are applicable to each step. If only one contract allows access to a particular root entity through a single access path, the rules engine may designate the access path for use. If multiple contracts and/or multiple access paths allow access to a particular root entity, various conflict rules may be configured to choose which contract and access path to use. If all root entities have a valid access path, the constrained environment may execute the requested pipeline or computation using the identified access path for each root entity.

As such, entitlements may be chained, triggered, and/or enforced in a constrained environment. Whether an entitlement is granted on a dataset, an output of a data privacy pipeline, or an intermediate dataset generated by an intermediate step of a data privacy pipeline, the output of the entitlement may be restricted to the constrained environment and assigned an identifier. As a result, an owner of a shielded asset may grant a beneficiary an entitlement to use the shielded asset in the constrained environment, subject to specified constraints upon access and policies applied upon downstream use, without exposing the shielded asset and without requiring the grantor to explicitly authorize every downstream use. Thus, authorized beneficiaries can build pipelines and other computations that make use of any number of entitlements within the constrained environment, without the need for the grantors of the entitlements to participate in building downstream pipelines and other computations. When a particular data consumer requests to trigger a pipeline or other computation that relies on any entitlements, an enforcement mechanism may operate to verify whether the data consumer's triggering of the requested pipeline or computation would satisfy the entitlements. If the entitlement constraints and policies can be satisfied, the requested pipeline or computation can be authorized, triggered, and executed in the constrained environment. As such, the techniques described herein provide an enhancement to data privacy pipelines, allowing parties can come together and decide what to compute in a more flexible way than in prior techniques.

Entitlements and Example Operating Environment

Rather than starting from the premise that all participants should agree on all computational steps to be performed when generating collaborative data, a constrained environment may be provided that allows an owner (e.g., data owner, script owner) or other authorized participant to grant an entitlement to access a particular shielded resource for unspecified downstream use in the constrained environment, subject to specified constraints upon access and policies applied on downstream use. For example, a data contributor may want to provide access to its data (or some other shielded asset), but may not want to be involved in the approval and enforcement of complex pipelines that use its data. In this case, the data contributor can grant an entitlement to a particular beneficiary to access and/or use its data, subject to designated entitlement constraints and/or policies. Parameters of an entitlement, including applicable constraints, policies, data ownership, and/or export permission may be defined by an associated collaborative intelligence contract, which may designate and parameterize access to any number of shielded assets (e.g., datasets, computational steps, pipelines, jobs, queries, audit events, and the like). Access to a particular shielded asset may be tailored to a particular user account, user group, role, or some other basis.

Figure 2:
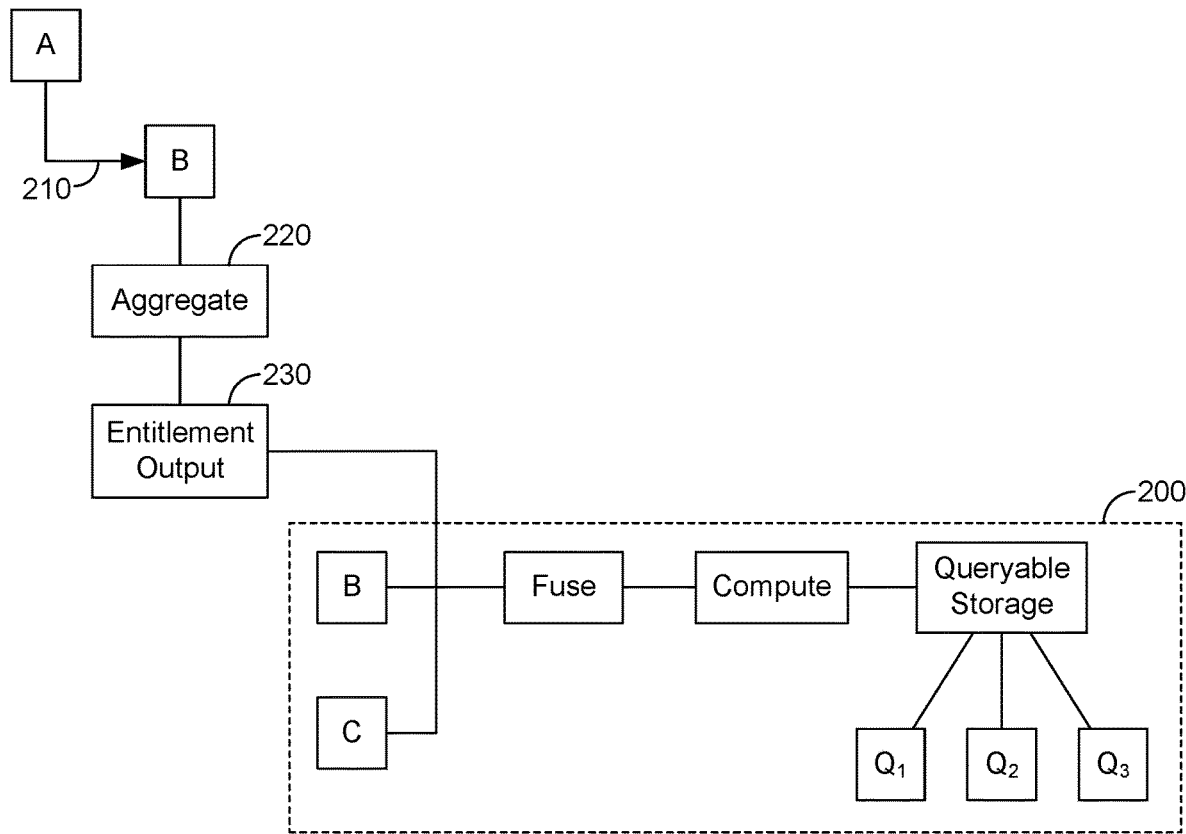
FIG. 2 is a block diagram of an example multi-participant pipeline implemented with an entitlement, in accordance with embodiments described herein.

By way of example, FIGS. 1 and 2 illustrate two different ways to generate collaborative data. FIG. 1 illustrates an example with a data privacy pipeline having three data contributors A, B, and C. In this example, the three data contributors A, B, and C collaborate to build pipeline 100, which serves as a basis for a single contractual agreement among the three data contributors. As such, data contributors A, B, and C are all participants to pipeline 100. In this simple example, each participant contributes data, and pipeline 100 is configured to fuse and perform some computation over the data, and store the result in some queryable storable.

Now consider the possibility that A does not care about the particular computation or the different possible downstream queries, as long as some particular constraint is satisfied, such as an aggregation constraint (e.g., apply some aggregation script on whatever portion of A's data is used). Rather than requiring A to collaborate on an entire pipeline 100, which may require A to review and sign off on the entire pipeline, in some embodiments, A can grant some other participant such as B an entitlement to use A's data, subject to a defined entitlement constraint (applied when the data is accessed) and/or entitlement policy (enforced on downstream uses). FIG. 2 illustrates such an example. Example pipeline 200 may involve similar computations as pipeline 100. However, rather than having A participate in building pipeline 200, A grants B an entitlement 210 to use A's data (or some other shielded asset required to exist or execute in a constrained environment), subject to an aggregation constraint 220. As such, B may use entitlement 210 to build off of A's data. When B accesses and/or uses A's data pursuant to the entitlement, the aggregation constraint 220 can be automatically applied to generate entitlement output 230, which may then be used in downstream operations. Thus, B may use A's data in a collaboration with C, without requiring A to participate in the collaboration.

Generally, entitlement constraints may be applied and fulfilled by a constrained environment when a shielded asset governed by the entitlement is accessed, for example, by ingesting the shielded asset into or otherwise identifying the shielded asset in the constrained environment, producing an entitlement output. For example, an input dataset may be filtered and aggregated, and the resulting dataset may be used as the entitlement output. Entitlement policies may define rules and restrictions on how an entitlement output may be used within the constrained environment, and/or on downstream operations in the constrained environment. Thus, once an entitlement is exercised and its constraints are fulfilled, applicable policies may be applied on downstream operations. For example, a data residency policy may be applied to ensure designated data does not leave a particular geographic region.

In some embodiments, the constrained environment may be configured to export data only when the data consumer requesting to export has sufficient ownership of the data to be exported or otherwise has export permission. Ownership and/or export permission may be defined in an associated collaborative intelligence contract. If a data consumer does not have ownership over an entitlement output, the constrained environment may prohibit exporting an entitlement output and/or may prohibit associated computations (e.g., by denying a request to trigger an associated pipeline to generate and export data that the data consumer does not have the right to export). Absent data ownership or permission to export, a beneficiary of an entitlement may instead be authorized to use an entitlement output within the constrained environment, subject to defined policies. For example, the beneficiary may be authorized to use the entitlement output in a data privacy pipeline in the constrained environment, grant another entitlement on the intermediate dataset, or other scenarios. Thus, in some embodiments, even when a data consumer does not have ownership of an entitlement output, the constrained environment may allow the data consumer to trigger computations involving the entitlement output within the constrained environment. More specifically, absent data ownership or permission to export, an entitlement output may be treated as an intermediate dataset required to exist within the constrained environment, and requested computations (e.g., a pipeline relying on an entitlement) may be permitted when the entitlement constraints and policies can be satisfied. For example, although a data consumer may not have the right to export a particular dataset, the data consumer may have the right to derive and export some collaborate data (e.g., statistics) from the intermediate dataset. More generally, an entitlement output may remain in the constrained environment as an intermediate dataset, which may be used in various ways within the constrained environment without the need for the grantor to approve each downstream use.

The constrained environment may enforce any applicable constraints upon access and may enforce any applicable policies while executing requested downstream computations. For example, if an entitlement to use a particular dataset comes with a policy that requires any downstream operations to run a particular script at the end (e.g., an aggregate script), the constrained environment may permit and execute downstream operations, and run the script on the output. Generally, policies on an upstream entitlement may be carried downstream and enforced on downstream computations. In some embodiments, other entitlements may be granted on intermediate datasets to be generated by downstream computations in the constrained environment, in which case, policies on an upstream entitlement may be carried downstream and applied as constraints and/or policies on downstream entitlements.

Designated entitlement constraints and policies can be defined using any of the various types of constraints described herein, including data access constraints, data processing constraints, data aggregation constraints, and/or data sanitation constraints. In some embodiments, one or more data governance policies may be defined and applied. Example data governance policies include a data residency policy (e.g., data is not allowed to leave a particular geographic region), an encryption policy (e.g., output must be encrypted), data retention policy, data tagging policy (e.g., data must be labeled public, private confidential), and/or the like. Generally, some constraints and policies may be capable of being fulfilled and extinguished upon execution. For example, a policy may require running an aggregation script at some point. In this case, the policy may be extinguished upon execution of the script, in which case, the policy may no longer need to be tracked and carried forward. In other cases, a policy may impact what may be output from the constrained environment. For example, a policy may require some aggregation constraint on whatever data is output from the constrained environment, such as requiring a minimum aggregation amount of output data (e.g., at least N rows or distinct field values). In this case, the policy may be tracked and carried forward, and operations that would satisfy the policy may be permitted, while operations that would not satisfy the policy may be denied.

Data ownership rights and/or permission to export data may be specified in and parameterized by an associated collaborative intelligence contract. For example, a collaborative intelligence contract defining a data privacy pipeline may designate ownership of data and/or permission to export data generated at any stage of the pipeline, including intermediate datasets generated by an intermediate step and collaborative data generated by a final or output step. In some embodiments, ownership of an intermediate dataset may be specified by granting an entitlement on the intermediate dataset and specifying ownership or permission to export using an export policy. Thus, an authorized participant to a data privacy pipeline may grant an entitlement for a beneficiary to use intermediate data generated by the data privacy pipeline, subject to an export policy that forbids exporting the data, but permits generating and export certain derived data (e.g., statistics). In some embodiments, when ownership/permission to export an intermediate dataset (e.g., generated by an intermediate step) is not specified, the intermediate dataset may be deemed to be owned by the governing contract and may be claimed by any of the participants to the data privacy pipeline or parties to the contract. In these embodiments, when ownership/export permission is not specified, any participant to a data privacy pipeline may be authorized to export an intermediate dataset, grant entitlements on an intermediate dataset, and/or delegate the right to export to an entitlement beneficiary. In some embodiments, when an entitlement has been granted on data owned by a contract, the contract may relinquish ownership when all constraints and policies have been fulfilled, allowing a downstream user to export derived data, unless some other ownership or export permission rule has been specified. Thus, entitlements can be granted by any participant with an ownership right or export permission (e.g., an entitlement granted to itself or to a third party) to compute and/or export an intermediate dataset out of the constrained environment.

To facilitate downstream use of an intermediate dataset, whether the dataset comes from an intermediate step of a data privacy pipeline or an entitlement output restricted to a constrained environment, the intermediate dataset may be identified (e.g., assigned an ID) and ownership/export permission may be assigned or otherwise determined (e.g., by the governing contract or the constrained environment). Now that the intermediate dataset is identifiable and ownership/export permission has been defined, new entitlements can be granted on the intermediate dataset. These new entitlements that are granted may be more restrictive or less restrictive than upstream constraints or policies (e.g., for upstream entitlements or data privacy pipelines). However, as described in more detail below, an enforcement mechanism may operate to verify that a data consumer's triggering of a requested pipeline or computation would satisfy any invoked entitlements, including verification of any applicable constraints and/or policies on each relevant step.

As such, entitlements allow for the creation of a more flexible type of multi-party pipeline than in prior techniques. While some circumstances may be well suited to multiple parties agreeing on all steps of a data privacy pipeline, entitlements allow participants to contribute (e.g., data) without requiring each contributor to approve every downstream use. Entitlements may be used in a variety of applications. For example, collaborating parties may grant each other mutual entitlements, which need not be symmetric. Policies may be specified so a policy-constrained entitlement accomplishes the same or similar effect as a mutually agreed upon data privacy pipeline. In another example, entitlements may be chained to other entitlements and/or any number of data privacy pipelines, forming a sequence, and policies may be specified so the resulting sequence accomplishes the same or similar effect as a universally agreed upon data privacy pipeline.

Figure 3:
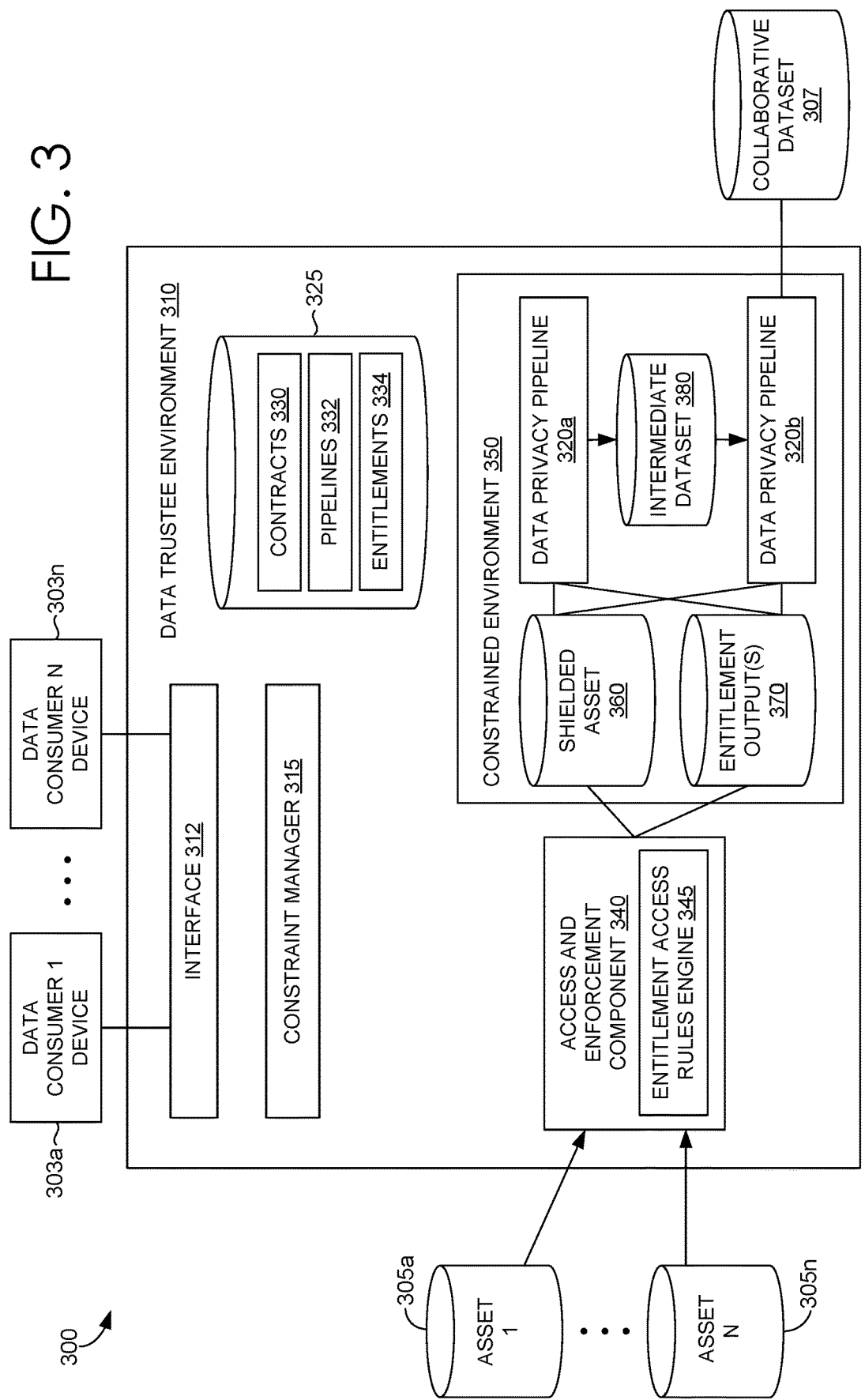
FIG. 3 is a block diagram of an example collaborative intelligence environment, in accordance with embodiments described herein.

Turning now to FIG. 3, FIG. 3 a block diagram of example collaborative intelligence environment 300 suitable for use in implementing embodiments of the invention is shown. Generally, collaborative intelligence environment 300 is suitable for generation of collaborative intelligence, and, among other things, facilitates constraint computing and constraint querying. Collaborative intelligence environment 300 or a portion thereof (e.g., data trustee environment 310) may, but need not, be implemented in a distributed computing environment such as distributed computing environment 1100, discussed below with respect to FIG. 11. Any or all of the components of collaborative intelligence environment 300 can be implemented as any kind of computing device, or some portion thereof. For example, in an embodiment, data consumer devices 303a through 303n can each be a computing device such as computing device 1200, as described below with reference to FIG. 12. Further, data trustee environment 310 may be implemented using one or more such computing devices. In embodiments, these devices can be any combination of a personal computer (PC), a laptop computer, a workstation, a server, a mobile computing device, a PDA, a cell phone, or the like. The components of collaborative intelligence environment 300 may communicate with each other via one or more networks, which may include, without limitation, one or more local area networks (LANs) and/or wide area networks (WANs). Such networking environments are commonplace in offices, enterprise-wide computer networks, intranets, and the Internet.

At a high level, collaborative intelligence environment 300 may include a constrained environment (e.g. data trustee environment 310, or portion thereof, such as constrained environment 350) within with designated shielded assets are required to exist or execute. Generally, data trustee environment 310 and/or constrained environment 350 may be capable of deriving collaborative data using shielded assets (e.g., data, scripts, data privacy pipelines) provided by data owners or other authorized providers (e.g., tenants) subject to configurable constraints, without exposing the shielded assets. Any number of tenants can input or otherwise configure any number of assets (e.g., assets 305a through 305n) into data trustee environment 310 and/or constrained environment 350 and designate one or more constraints and/or policies governing their use. Data trustee environment 310 and/or constrained environment 350 can derive collaborative data (e.g., collaborative dataset 307) based on the one or more constraints and/or policies.

As used herein, a constrained environment refers to a secured, executable environment run by some sort of trusted party within which designated shielded assets can be accessed and/or used, while enforcing designated constraints and policies. The constrained environment may be capable of executing constrained computations to generate collaborative data using shielded assets (e.g., data, scripts, data privacy pipelines), without exposing the shielded assets, intermediate datasets, or other restricted data to unauthorized parties. For example, to avoid exposing restricted data, the constrained environment may be inaccessible to any tenants or data consumers (e.g., the constrained environment may have no network access). Any number of data consumers (e.g., operating one of data consumer devices 103a through 103n) may issue requests to trigger a pipeline or other computation that accesses and/or uses a shielded asset that is required to exist or execute within a constrained environment. Prior to triggering the requested pipeline or other computation, an enforcement mechanism may operate (e.g., via access and enforcement component 340) to verify whether the data consumer's triggering of the requested pipeline or computation would satisfy the entitlements (i.e., constraints/policies defined by the entitlements). If approved, the constrained environment may execute the requested pipeline or computation. In some embodiments, the constrained environment may temporarily store shielded assets, spin up a triggered data privacy pipeline or other applicable computations, generate any applicable intermediate datasets (e.g., intermediate dataset 380), export collaborative data when authorized, and/or spin down any pipelines or other computations that were spun up (e.g., by deleting cached data such as intermediate datasets used in arriving at collaborative data, temporarily stored shielded assets), and/or the like. In some embodiments, a constrained environment may be provided as part of a data trustee environment (e.g., constrained environment 350 of data trustee environment), but this need not be the case. Although embodiments are described herein with respect to constrained environment 350, the configuration in FIG. 3 is not meant to limiting, and other configurations may be implemented within the scope of the present disclosure.

In the embodiment illustrated in FIG. 3, data trustee environment 310 may receive various requests to access shielded assets governed by a collaborative intelligence contract (e.g., via interface 312). For example, a data consumer (e.g., operating one of data consumer devices 303a through 303n) may issue a request to trigger a pipeline that uses a shielded asset, a request to access a shielded asset through a governing entitlement, or some other type of request. In some embodiments, tenants may store assets that are designated for use as shielded assets in data trustee environment 310 (e.g., in storage allocated to the tenant). When a shielded asset is designated for use by a particular collaborative intelligence contract (e.g., a data privacy pipeline or entitlement), a digitized record associated with the contract, pipeline, and/or entitlement may include a reference or otherwise identify the location of the shielded asset. As such, when request to trigger a pipeline or computation received, any associated shielded assets may be identified (e.g., by constraint manager 315 looking up shielded assets associated with an invoked contract 330, pipeline 332, and/or entitlement 334), and access and enforcement component 340 may determine whether to access each shielded asset associated with the request. In embodiments where a requested shielded asset is governed by an entitlement (e.g., one of entitlements 334), access and enforcement component 340 may trigger entitlement access rules engine 345 to determine whether a valid access path to the shielded asset exists through one of the contracts 330. If access to a shielded asset is granted, access and enforcement component 340 may ingest the shielded asset into a secured, constrained, and/or sandboxed portion of data trustee environment 310, such as constrained environment 350.

In some embodiments, digitized representations of collaborative intelligence contracts 330, data privacy pipelines 332, and/or entitlements 334 may be maintained in a contract database 325 accessible to constraint manager 315. For example, a contractual agreement to share data may be stored using one or more data structures in a manner that digitally represents, references, or otherwise identifies the contract (e.g., a unique identifier), authorized participants and data consumers, access rights, shielded assets, computational steps, ownership/export permission, and/or the like. Thus, a digitized collaborative intelligence contract 330 may designate and/or parameterize access to any number of shielded assets may only be used within a constrained environment. Example shielded assets include datasets, computational steps, pipelines, jobs, queries, audit events, and the like.

In some cases, a digitized contract 330 may identify an associated data privacy pipeline 332 and/or vice versa. In one example, a digitized contract between participants may define an associated data privacy pipeline that has been agreed upon among the participants. In this case, the digitized contract and associated data privacy pipeline may be associated with one another. In another example, a first data privacy pipeline defined by a first contract may be built upon in some manner (e.g., building off an intermediate dataset generated by an intermediate step of the data privacy pipeline, building off data generated by a final or output step of the data privacy pipeline), and used in a second data privacy pipeline that uses shielded assets governed by a second contract. Thus, some data privacy pipelines may be based on and traceable to multiple contracts. As such, each digitized contract that governs access to a shielded asset used in a multi-contract pipeline may be associated with the multi-contract pipeline. Since pipelines may be created based on many contracts, it should be understood that a digitized contract and a data privacy pipeline may be distinct entities, in certain embodiments. A digitized contract 330 and/or an associated pipeline 332 may digitally represent an authorized access path through computational steps of the pipeline (e.g., via a graph with nodes and edges), and may digitally represent associated constraints and an indication of whether a particular constraint has been satisfied (e.g., via node or edge properties).

In some cases, a digitized contract 330 may identify an associated entitlement 334 to a shielded asset. In one example, a digitized contract between participants may define an associated entitlement, from a grantor, granting a beneficiary access to a shielded asset (e.g., dataset or script owned by the grantor, a data privacy pipeline where the grantor is an authorized participant, an intermediate dataset to be generated by an intermediate step of a data privacy pipeline where the grantor is an authorized participant). In some cases, an entitlement defined by a particular contract may be built upon in some manner, for example, by using an entitlement output in a pipeline that uses shielded assets for which access is governed by some other contract, and/or by using an entitlement output in a pipeline that uses an entitlement output from some other entitlement governed by some other contract. Thus, a particular pipeline may be based on multiple entitlements and/or multiple contracts, and any of these digitized entities may be associated with and traceable to one another. For example, each digitized contract that governs an entitlement to a shielded asset may be associated with and traceable to any pipeline that uses the entitlement or shielded asset. In another example, each entitlement may be associated with and traceable to each digitized contract that governs access to a shielded asset used by the entitlement (e.g., an entitlement to an intermediate dataset or a completed output from a multi-contract pipeline). Since entitlements may be granted on shielded assets governed by multiple contracts, it should be understood that a digitized contract 330 and a digitized entitlement 334 may be distinct entities, in certain embodiments. In some embodiments, a digitized entitlement 334 may identify associated executable constraints to be applied upon accessing a shielded asset. Additionally or alternatively, a digitized entitlement 334 may identify associated executable policies to be carried with an entitlement output and applied during downstream use. Some policies may be satisfied and extinguished upon execution (e.g., an aggregation script), while others may be carried and applied downstream.

Generally, a digitized contract 330, an associated entitlement 334, and/or an associated pipeline 332 may be associated with a digital representation of an authorized access path through the entitlement 334 and/or the associated pipeline 332 (e.g., via a graph with nodes and edges), and may be associated with a digital representation of associated constraints, policies, and/or an indication of whether a particular constraint or policy has been satisfied (e.g., via node or edge properties).

In the embodiment illustrated in FIG. 3, when data trustee environment receives a request to trigger a data privacy pipeline or some other computation (e.g., via interface 312), access and enforcement component 340 may determine whether to grant access to each shielded asset associated with the request. In some embodiments, any number of tenants (e.g., of data trustee environment 310) can designate any number of shielded assets for use by any number of data privacy pipelines and/or entitlements. In some cases, an asset designated by a tenant for use as a shielded asset may be stored in a portion of data trustee environment 310 allocated to the tenant for the tenant's use. In some cases, an asset designated by a tenant for use as a shielded asset may be stored outside data trustee environment at a designated location that is accessible to the data trustee environment. In any event, upon receiving a request that would require access to a shielded asset (e.g., a request to trigger a data privacy pipeline that uses the shielded asset, a request to access the shielded asset through an entitlement), access and enforcement component 340 may evaluate the access request and determine whether to grant access, as explained in more detail below. Any suitable access control technique or tool may be used (e.g., role based access control, access control lists, data governance tools) such that access can be evaluated on the basis of any suitable identity (e.g., user identity, role, group, some other attribute). If access is granted, the requested asset(s) may be ingested into a secured, constrained, and/or sandboxed portion of data trustee environment 310, such as constrained environment 350, where it may be used as a shielded asset.

Access and enforcement component 340 may determine whether to grant access to each shielded asset associated with the request in any suitable manner. For example, an incoming request to trigger a particular data privacy pipeline may include an identification that can be used to look up associated parameters in contract database 325, including any associated contracts, entitlements, and/or other related data privacy pipelines (e.g., which may be part of the triggered pipeline), any of which may be used to look up associated shielded assets that would be required in order to execute the requested pipeline. The determination whether to grant access to each shielded asset may depend on whether a requested pipeline includes any entitlements. For example, if a participant to a data privacy pipeline without any entitlements requests to trigger the pipeline, access to any shielded assets used by the data privacy pipeline may have already been agreed upon by the participants. As such, access and enforcement component 340 may determine that participants to a data privacy pipeline without any entitlements are authorized to access the associated shielded assets and export the resulting dataset (e.g., collaborative dataset 307). In embodiments where an associated shielded asset is governed by an entitlement (e.g., one of entitlements 334), access and enforcement component 340 may trigger entitlement access rules engine 345 to determine whether a valid access path to the shielded asset exists through one of the contracts 330, as described in more detail below. Additionally or alternatively, access and enforcement component 340 may determine whether any requested outputs that rely on or otherwise derive from an entitlement (e.g., a request to generate and export collaborative data out of constrained environment 350 and/or data trustee environment 310) are consistent with any designated data ownership rights and/or permissions to export. If access and enforcement component 340 determines that a requesting data consumer is authorized to access the associated shielded assets and export the requested dataset, access and enforcement component 340 may trigger constrained environment 350 to execute the requested pipeline or other computation.

If access is granted, access and enforcement component 340 may trigger constrained environment 350 to ingest any associated shielded assets 360 and/or generate any entitlement outputs 370. For example, constrained environment 350 may access any assets associated with a request (e.g., from a tenant's account storage) and/or may ingest and temporarily store them (or a requested portion thereof) in constrained environment 350 as shielded assets 360. In some scenarios, any of shielded assets 360 may be used as an entitlement output. Additionally or alternatively, in embodiments where an entitlement specifies some entitlement constraints that require some additional processing (e.g., sanitation constraints), constrained environment 350 may apply the entitlement constraints to generate entitlement outputs 370 from ingested shielded assets 360 and/or may temporarily store them in constrained environment 350. As such, constrained environment may spin up a triggered data privacy pipeline (e.g., data privacy pipelines 320a and 320b) or other applicable computations, generate any applicable intermediate datasets (e.g., intermediate dataset 380), export collaborative data (e.g., collaborative dataset 307) when authorized, and/or spin down any pipelines or other computations that were spun up (e.g., by deleting cached data such as intermediate datasets used in arriving at collaborative data, temporarily stored shielded assets), and/or the like.

Figure 4:
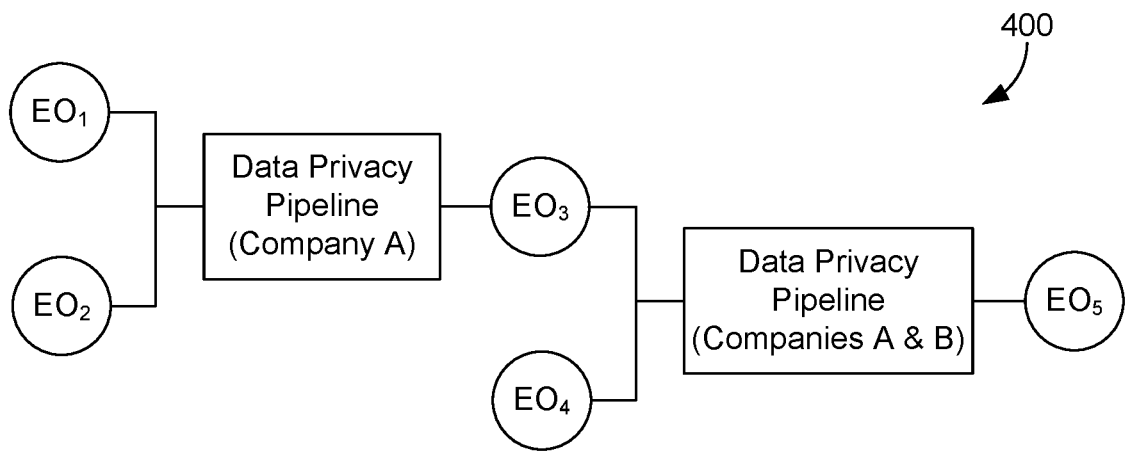
FIG. 4 is a block diagram of an example chain of entitlements, in accordance with embodiments described herein.

Turning now to FIG. 4, FIG. 4 is a block diagram of an example chain of entitlements 400, in accordance with embodiments described herein. In this example, assume a particular company A has been granted different entitlements to use input datasets from two other companies. The two entitlements are governed by different contracts and define corresponding entitlement outputs $EO_1$ and $EO_2$. As such, company A can create a data privacy pipeline that uses these input datasets to generate some computational result. Company A can then grant an entitlement to others to trigger its pipeline and use the computational result as an entitlement output $EO_3$, assuming there are no conflicts with the upstream entitlements governing $EO_1$ and $EO_2$.

For example, assume company A wants to collaborate with company B. Company A will provide its data privacy pipeline via an entitlement granted to company B (defining entitlement output $EO_3$), and company B will provide a dataset that it has access to via a separate entitlement from company C (defining entitlement output $EO_4$). In this situation, companies A and B can collaborate to create a data privacy pipeline that builds off of entitlement outputs $EO_3$ and $EO_4$. Assuming there are no conflicts with the upstream entitlements governing $EO_{1-4}$ or the agreement between companies A and B, either company A or company B may grant an entitlement to some other company to use the computational result of their data privacy pipeline as entitlement output $EO_5$.

The example chain of entitlements 400 illustrated in FIG. 4 is one example of a sequence of computations that may be digitally represented in contract database 325 of FIG. 3. For example, the entire chain 400 may be represented as a single master pipeline and/or as a collection of constituent pipelines. Any or all of the governing contracts, pipeline(s), and/or underlying entitlements may be associated with one another or otherwise identified by contract database 325. Thus, when particular data consumer (e.g., company B) requests to trigger a particular pipeline (e.g., the entire chain 400), access and enforcement component 340 may lookup the governing contracts, pipeline(s), and underlying entitlements, and entitlement access rules engine 345 may verify whether company B's triggering of the pipeline would satisfy all the applicable constraints and entitlement policies.

Figure 5:
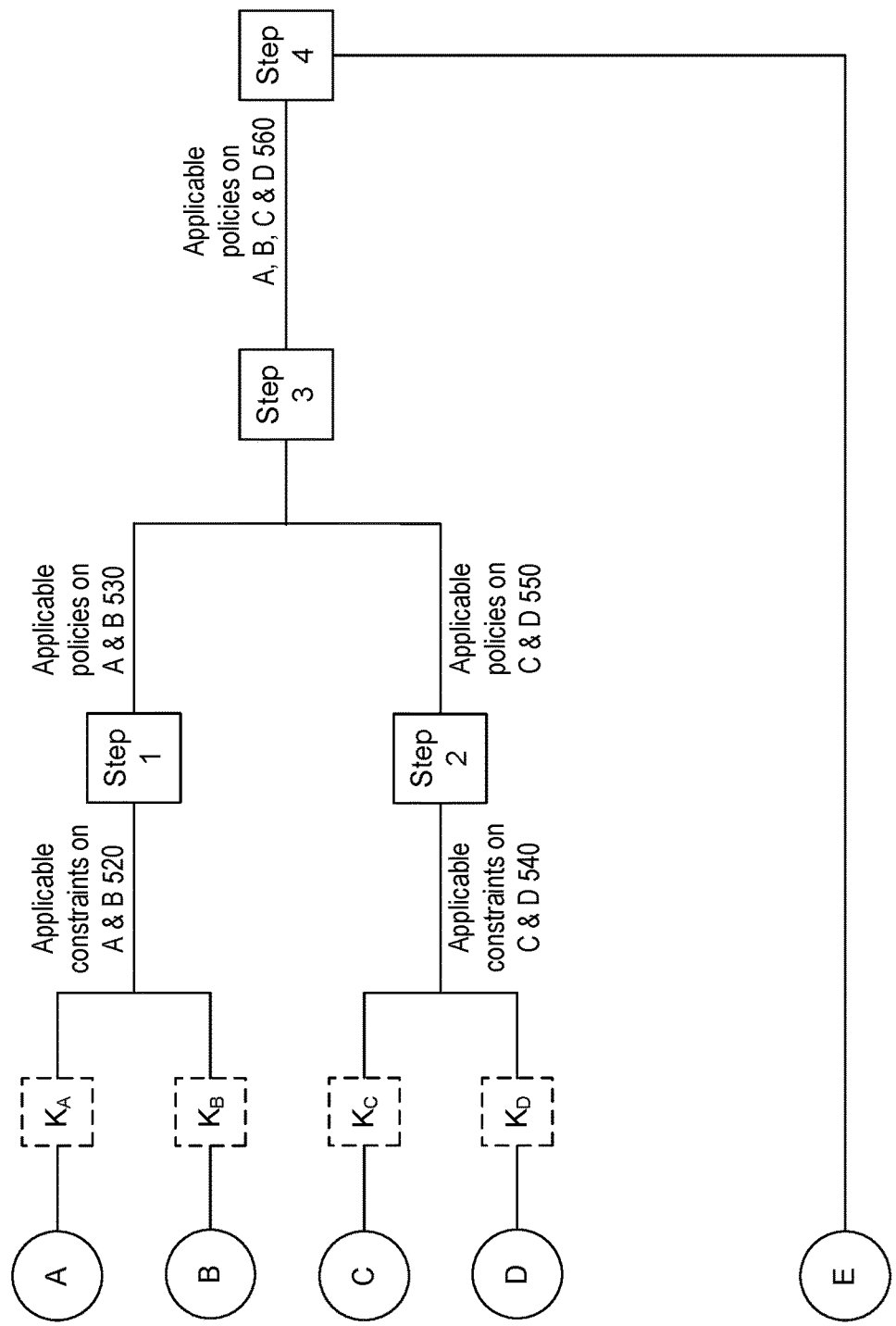
FIG. 5 is a block diagram of an example data privacy pipeline that includes entitlements, in accordance with embodiments described herein.

At a high level, when a data consumer requests to trigger a pipeline or other computation that relies on any entitlements, entitlement access rules engine 345 may operate an enforcement mechanism to verify whether the data consumer's triggering of the requested pipeline or computation would satisfy the entitlements (i.e., constraints/policies defined by the entitlements). FIG. 5 illustrates some of the considerations in operating an enforcement mechanism on an example data privacy pipeline 500 that includes entitlements. In this example, data privacy pipeline 500 includes input data provided by five different entities A-E. For example, entities A-E may be different hospitals, universities, and research institutions collaborating to try to identify a treatment for cancer. Assume entity E has negotiated entitlements to use data from entities A-D, governed by entitlement contracts $K_{A-D}$, and entity E designs data privacy pipeline 500 using the different entitlements.

Initially, in order to access and ingest data from A and B to point 520, any entitlement constraints defined by contracts $K_A$ and $K_B$ must be fulfilled (e.g., data can only be accessed during a particular window of time). As long these entitlement constraints are fulfilled, entity E may ingest data from A and B and perform some computational step 1 on the ingested data (e.g., a fuse operation). In this example, any policies defined by contracts $K_A$ and $K_B$ are carried downstream and operative on downstream operations. As such, in this example, the result of computational step 1 at point 530 must satisfy any policies from A and B (e.g., may only fuse with data having a minimum number of rows or distinct field values). Similarly, in order to access and ingest data from C and D to point 540, any entitlement constraints defined by contracts $K_C$ and $K_D$ must be fulfilled, and in order to perform computational step 2 to generate a computational result at point 550, any policies defined by contracts $K_C$ and $K_D$ must be fulfilled. In order to perform computational step 3 to generate a computational result at point 560, any policies defined by contracts $K_A$, $K_B$, $K_C$, and $K_D$ must be fulfilled, and so on. As such, in order to verify whether a data consumer's triggering of a requested pipeline would satisfy any constituent entitlements, an enforcement mechanism (e.g., entitlement access rules engine 345 of FIG. 3) may advance through the requested computational steps and verify any applicable constraints and policies on each step.

Now assume that the entitlement that was granted by entity A to entity E is an entitlement to a data privacy pipeline that itself relies on upstream entitlements granted to entity A to use data from some other entities F-H. Now, pipeline 500 may need to ingest data from entities F-H, and if entity E wants to trigger pipeline 500, any constraints and policies defined by these upstream entitlements governing the use of data from entities F-H may need to be looked up and evaluated. More generally, when a data consumer requests to trigger a pipeline or other computation, all root entities that must be accessed through an entitlement may be identified. As used herein, a root entity may be defined as an input asset (e.g., an input dataset or script) provided into a requested pipeline or other computation without any prior processing of the input asset. When a request is received to trigger a data privacy pipeline, that pipeline may be a part of a larger master pipeline comprising any number of constituent pipelines and entitlements. Root entities may be thought of as inputs (e.g., datasets, scripts, etc.) into the master pipeline.

As such and returning to FIG. 3, upon receiving a request to trigger a particular pipeline, entitlement access rules engine 345 may access all root entities of the pipeline that require an entitlement, load all contracts and/or corresponding pipelines that reference one of the root entities, and search for one valid access path through the loaded contracts/pipelines. To accomplish this, entitlement access rules engine 345 may advance through the steps of each pipeline, verifying any applicable constraints and policies on each step. If only one contract allows access to a particular root entity through a single access path, entitlement access rules engine 345 may designate the access path for use. If multiple contracts and/or multiple access paths allow access to a particular root entity, entitlement access rules engine 345 may apply configured and/or pre-defined conflict rules to choose which contract and access path to designate for use.

If all root entities have a valid access path, entitlement access rules engine 345 may authorize the request and trigger constrained environment 350 to execute the requested pipeline using the identified access path for each root entity.

Figure 6:
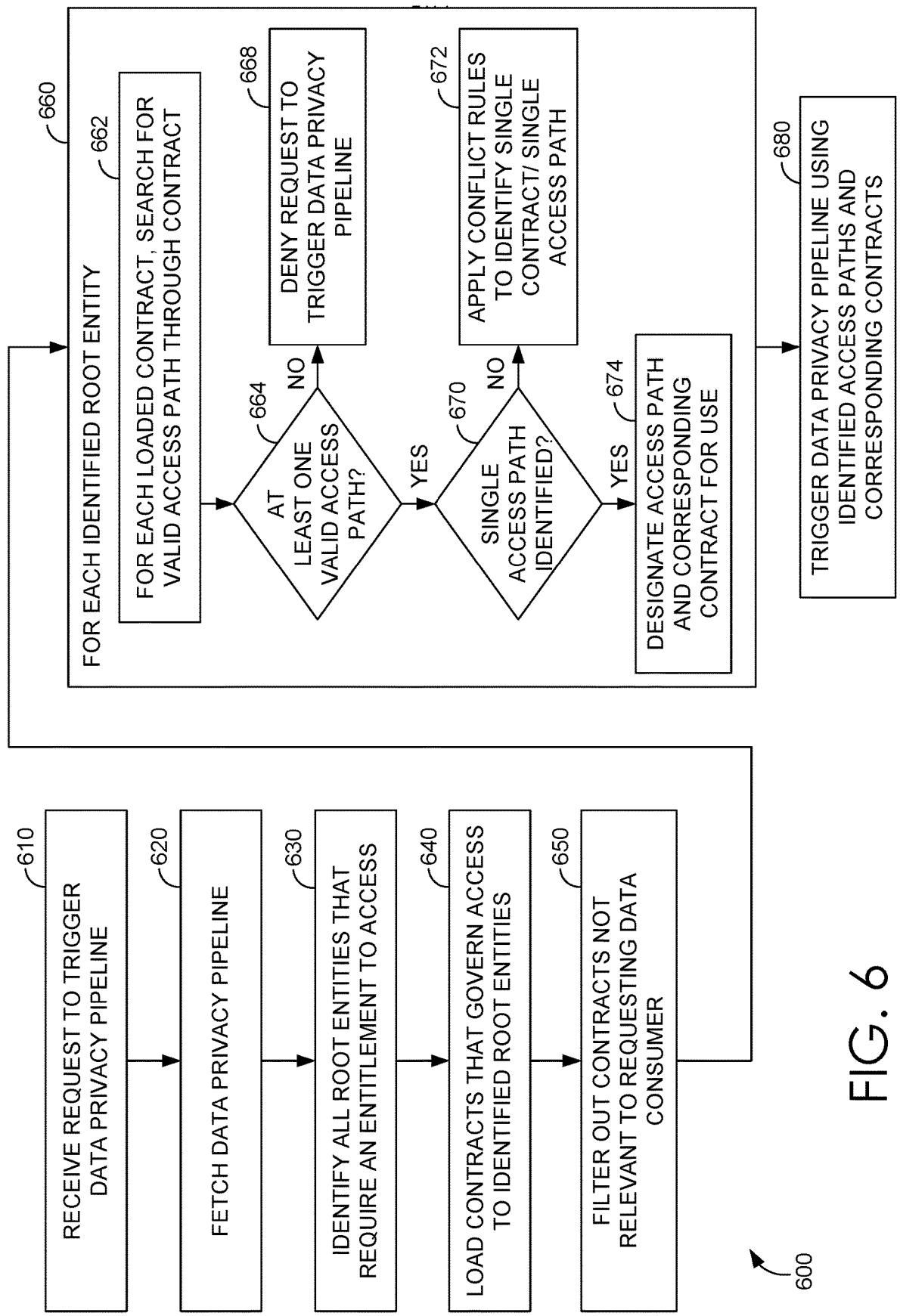
FIG. 6 is a flow diagram showing an example method of enforcing an entitlement, in accordance with embodiments described herein.

More specifically and turning now to FIG. 6, FIG. 6 depicts a flow diagram of an example method 600 of enforcing an entitlement. The method can be performed using the collaborative intelligence environment described herein. For example, in some embodiments, one or more computer storage media having computer-executable instructions embodied thereon can, when executed by one or more processors, cause one or more processors to perform the method in the collaborative intelligence environment. In some embodiments, method 600 may be performed by access and enforcement component 340 and/or entitlement access rules engine 345 of FIG. 3.

Initially at block 610, a request to trigger a data privacy pipeline is received. For example, a data consumer (e.g., operating one of data consumer devices 303a through 303n of FIG. 3) may issue a request to trigger a particular data privacy pipeline via interface 312 of data trustee environment 310. Generally, software associated with data trustee environment 310 (e.g., functionality associated with access and enforcement component 340 and/or entitlement access rules engine 345) may evaluate whether to execute the request by performing the following steps. To support such a configuration, in some embodiments, the request may be routed to a corresponding component for evaluation.

At block 620, the data privacy pipeline that was requested to be triggered is fetched (e.g., from contract database 325 of FIG. 3), and at block 630, all root entities of the data privacy pipeline that require an entitlement to access the root entity are identified. Generally, a particular data privacy pipeline may operate on any number of shielded assets (e.g., datasets, scripts, etc.). In some scenarios, the shielded assets used by a data privacy pipeline may have been agreed upon by all the participants to the pipeline such that the shielded assets do not require an entitlement. In other scenarios, a data privacy pipeline may operate on one or more entitlement outputs that rely on accessing some upstream shielded asset (e.g., an entitlement or another data privacy pipeline) that requires an entitlement to access and/or generate the shielded asset. In yet another scenario, the data consumer requesting to trigger the data privacy pipeline may not have participated in building the pipeline, but one of the participants granted the data consumer an entitlement to trigger the pipeline. Any or all of these scenarios may apply. Thus, in order to identify all root entities of the data privacy pipeline that require an entitlement, a variety of techniques may be applied.

For example, all root entities of a triggered data privacy pipeline that require an entitlement may be identified by fetching digitized representations of the triggered data privacy pipeline, associated contracts, associated pipelines, and/or associated entitlements, and identifying any root entities governed by one of the associated entitlements. In some embodiments, these root entities may be identified (e.g., prior to receiving a request to trigger the pipeline, upon receiving a request to trigger the pipeline), and the identified root entities may be associated with and looked up via a digitized representation of the pipeline, associated contracts, associated pipelines, and/or associated entitlements (e.g., in contract database 325 of FIG. 3). As such, upon receiving a request to trigger a particular pipeline, a digitized representation of the pipeline and/or any associated contracts, pipelines, and/or entitlements may be fetched, and the associated root entities may be looked up. By way of nonlimiting example, root entities requiring an entitlement may be identified by some list, property, metadata, and/or other indication associated with a triggered data privacy pipeline (or an associated contract, pipeline, and/or entitlement). Additionally or alternatively, in some scenarios, an access path may be traced upstream from a data privacy pipeline until the access path reaches a root entity that requires an entitlement. For example, if a triggered data privacy pipeline operates on an output generated by an upstream data privacy pipeline, an access path may be traced backwards from the output through the upstream data privacy pipeline. The access path may be traced back through any number of upstream pipelines to identify all root entities that require an entitlement.

Having identified all root entities that require an entitlement to access the root entity, at block 640, all contracts that govern access to the identified root entities may be loaded. Generally, any number of contracts may grant access to a particular root entity. For example, a particular script or dataset may be made available to any number of collaborators under terms governed and/or implemented by any number of corresponding contracts. For example, a particular contract may define or identify a data privacy pipeline, entitlement, or some other access path that references a particular root entity. As such, a digital collection of contracts (e.g., contracts 330 of contract database 325 of FIG. 3) may be searched to identify contracts that reference and/or grant access to a root entity.

At block 650, contracts that are not relevant to the requesting data consumer are filtered out. For example, some contracts will define, store, or otherwise identify an access constraint based on an identity or account associated with the user or account triggering the access. Access constraints for such contracts may be applied to identify and filter out contracts that do not grant access to the requesting data consumer, for example, based on the data consumer's identity (e.g., because the user is not on a designated whitelist, part of an authorized account, etc.). Contracts that have do not have access constraints based on an identity or account associated with the requesting user may be deemed to pass this threshold access inquiry.

At block 660, a method is performed for each identified root entity. More specifically, the method illustrated by blocks 662-674 may be applied for each identified root entity. Taking a particular root entity as an example, at block 662, each loaded contract may be searched for a valid access path through the contract to the root entity.

Initially, potential access paths and associated constraints and policies may be identified from a loaded contract. In some cases, a loaded contract may grant access to a root entity pursuant to an associated data privacy pipeline that has been agreed upon among the participants of the contract, subject to defined constraints. In some cases, a loaded contract may grant access to a root entity pursuant to an associated entitlement, subject to defined constraints and/or policies. In either case, the contract may identify an access path through one or more computational steps (e.g., steps of a data privacy pipeline or a processing policy) and identify any associated constraints and/or policies. In some cases, in order to access a particular root entity using a particular access path, some computational steps that are not on the direct route from the root entity may also be required to execute. Thus, potential access paths through a contract may include computational steps that would be required to execute in order to access a particular root entity. In any event, potential access paths through a contract, and associated constraints and policies, may be digitally represented, associated with the contract, and looked up. In some cases, this could be seen as identifying a master pipeline with all the computational steps that would be required to execute in order to trigger a requested pipeline (e.g., upstream computational steps incorporated by the requested pipeline via an entitlement).

When a potential access path through a loaded contract includes a data privacy pipeline without an entitlement (e.g., an upstream data privacy pipeline where access and use of all shielded assets has been agreed upon by all participants of the upstream pipeline), each of the computational steps of the pipeline may be evaluated to determine whether associated constraints would be satisfied. Initially, the computational steps may be evaluated—without executing the steps—to determine whether associated constraints would be satisfied. For example, an associated constraint may limit access to a particular time range (e.g., only on Tuesdays or only until a fixed end date), in which case the constraint may be evaluated based on the context of the request (e.g., a time associated with the request). If the constraints on a computational step would be satisfied, subsequent computational steps on the potential access path may be evaluated. If any potential access path is determined to be invalid because one of the constraints along the path would not be satisfied, the access path may be deemed invalid. Similarly, if the only access path through a loaded contract is determined to be invalid, the contract may be deemed invalid for use in fulfilling the request. In some cases, however, a particular pipeline or contract may have multiple potential access paths (e.g., alternate paths through a common computational step), in which case, each potential access path may be evaluated. If there is no permissible access path through a contract, the contract may be thrown out. If there is a permissible access path through a contract, the contract may be flagged as a candidate contract.

Generally in the case of entitlements and/or associated governing contracts, entitlements may have associated entitlement constraints and/or policies. When a potential access path through a loaded contract includes an entitlement governing access to a shielded asset, any associated entitlement constraints applicable upon access of the shielded asset may be evaluated, and any policies that must be carried downstream may be evaluated in association with downstream computational steps. Associated entitlement constraints may be evaluated—without generating the entitlement output—to determine whether the entitlement constraints would be satisfied. If the entitlements constraints would be satisfied, applicable policies may be carried downstream and evaluated in association with downstream computational steps (e.g., in a downstream data privacy pipeline such as the pipeline requested to be triggered)—again without executing the steps—to determine whether the applicable policies would be satisfied.

Generally, policies carried forward to a particular computational step may be evaluated in a similar manner as an applicable constraint on that computational step. In some cases, an applicable constraint or policy may be evaluated across multiple computational steps (e.g., data may only be used during a particular time during). Moreover, some applicable constraints may overlap, in which case, only the stricter one may need to be evaluated (e.g., when one constraint restricts use to once a week and another constraint restricts use to once a month, the stricter constraint—once a month—may be identified and evaluated). Generally, applicable and/or satisfied constraints/policies for each step may be tracked through proposed computational steps. In some cases, an applicable constraint or policy may be extinguishable (e.g., a requirement that data be anonymized prior to merging with another dataset, a requirement to run a particular script at some point). In these scenarios, when a determination is made that a particular computational step would fulfill an extinguishable constraint or policy, in some cases, that constraint or policy may no longer need to be evaluated on further downstream computational steps. Generally, the computational steps through a potential access path through a contract may be sequentially evaluated, advancing to subsequent computational steps when a determination is made that applicable constraints/polices on preceding computational steps can be fulfilled. If a particular computational step would not satisfy an applicable constraint/policy, in some cases, preceding computational steps may be revisited using an alternate access path.

In some cases where a potential access path uses an intermediate dataset to be generated by an intermediate step of a data privacy pipeline, subsequent computational steps of data privacy pipeline downstream from the intermediate step (e.g., computations steps that are not part of the potential access path and are not required to execute in order to trigger a requested pipeline) may not need to be evaluated. Such computational steps may be flagged to indicate those steps should not be executed in the event the access path is deemed valid and designated for use.

In some cases, a particular constraint or policy may only be capable of verification upon executing one or more computations along a potential access path (e.g., during runtime). For example, a policy may permit access to a dataset as long as it is merged into data with at least some number of entries (e.g., one million rows). In order to verify that policy, the computational steps along the potential access path may be conditionally executed (e.g., for the limited purpose of evaluating compliance), and the policy may be evaluated on the result. Since conditionally executing computational steps may be computationally expensive, in some embodiments, constraints or policies that can only be fully verified during runtime may be deemed conditionally satisfied and only evaluated at a later time, such as upon determining that a potential access path is otherwise valid. Furthermore, in such scenarios, a notification may be provided (e.g., to the requesting data consumer), and/or an interrupt may be provided requiring confirmation (e.g., from the requesting data consumer) before proceeding.

Accordingly, identified computational steps of a potential access path through a loaded contract that includes an entitlement may be evaluated. If there is no permissible access path through the entitlement, the corresponding contract may be thrown out. If there is a permissible access path through an entitlement, the corresponding contract may be flagged as a candidate contract.

Returning now to FIG. 6, the result of the search process of block 662 may be zero or more candidate contracts and zero or more potential access paths for a particular root entity. At block 664, a determination is made whether at least one valid access path was identified. If not, at block 668, the request to trigger the data privacy pipeline is denied. If at least one valid access path was identified, at block 670, a determination is made whether a single access path was identified. If a single contract with a single valid access path to the root entity is identified, at block 674, the access path and its governing contract may be designated for use to access the root entity. On the other hand, if more than one valid access path was identified, at block 672, conflict rules may be applied to identify a single contract and a single access path. That is, if a single contract is identified with multiple valid access paths to the root entity, or if multiple candidate contracts with valid access paths to the root entity are identified, any number and variety of conflict rules may be applied to select a single governing contract and/or a single valid access path. For example, default and/or preferred options may be selected, an interrupt may be provided requiring selection of a particular option (e.g., from the requesting data consumer), and/or other metrics may be applied to select an option (e.g., with the cheapest computation cost, fewest computations, minimum data to be generated, a most or least restrictive option, an option granting access to a smaller or larger class of resources, and/or others).

Block 660 may be repeated for each identified root entity. If a valid access path is identified for each root entity, the requested data privacy pipeline may be triggered using the identified access paths. For example, access enforcement component 340 and/or entitlement access rules engine 345 of FIG. 3 may trigger constrained environment 350 to execute the requested data privacy pipeline using the identified access paths.

Figure 7:
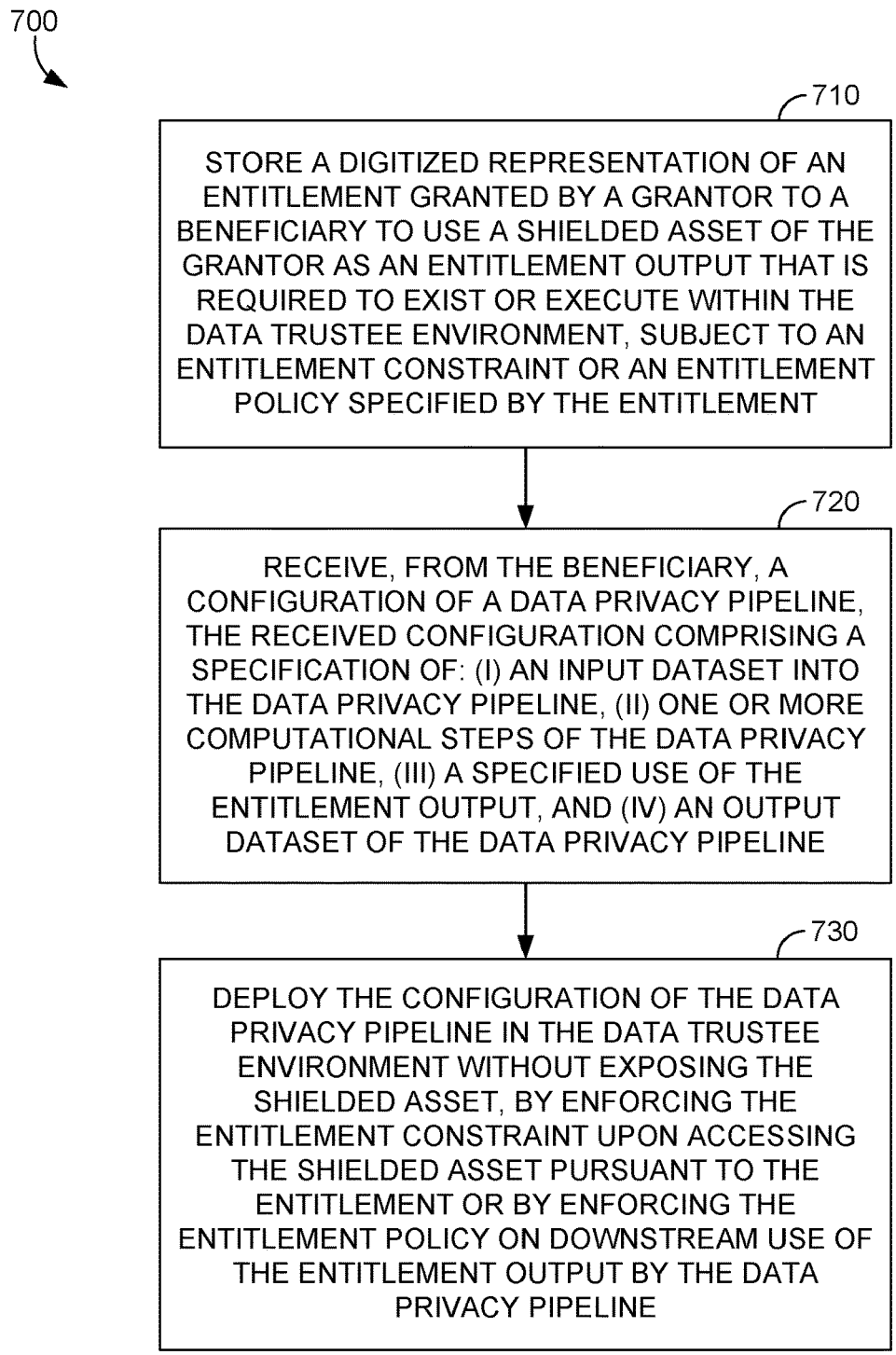
FIG. 7 is a flow diagram showing an example method of enforcing an entitlement, in accordance with embodiments described herein.

Turning now to FIG. 7, a flow diagram is provided showing an example method 700 of enforcing an entitlement, in accordance with embodiments described herein. The method can be performed using the collaborative intelligence environment described herein. For example, in some embodiments, one or more computer storage media having computer-executable instructions embodied thereon can, when executed by one or more processors, cause the one or more processors to perform the methods in the collaborative intelligence environment.

Initially at block 710, a digitized representation of an entitlement is stored. The entitlement is granted by a grantor to a beneficiary to use a shielded asset of the grantor as an entitlement output that is required to exist or execute within a data trustee environment, subject to an entitlement constraint or an entitlement policy specified by the entitlement. At block 720, a configuration of a data privacy pipeline is received from the beneficiary. The received configuration includes a specification of: (i) an input dataset into the data privacy pipeline, (ii) one or more computational steps of the data privacy pipeline, (iii) a specified use of the entitlement output, and (iv) an output dataset of the data privacy pipeline. At block 730, the configuration of the data privacy pipeline is deployed in the data trustee environment without exposing the shielded asset, by enforcing the entitlement constraint upon accessing the shielded asset pursuant to the entitlement or by enforcing the entitlement policy on downstream use of the entitlement output by the data privacy pipeline.

Figure 8:
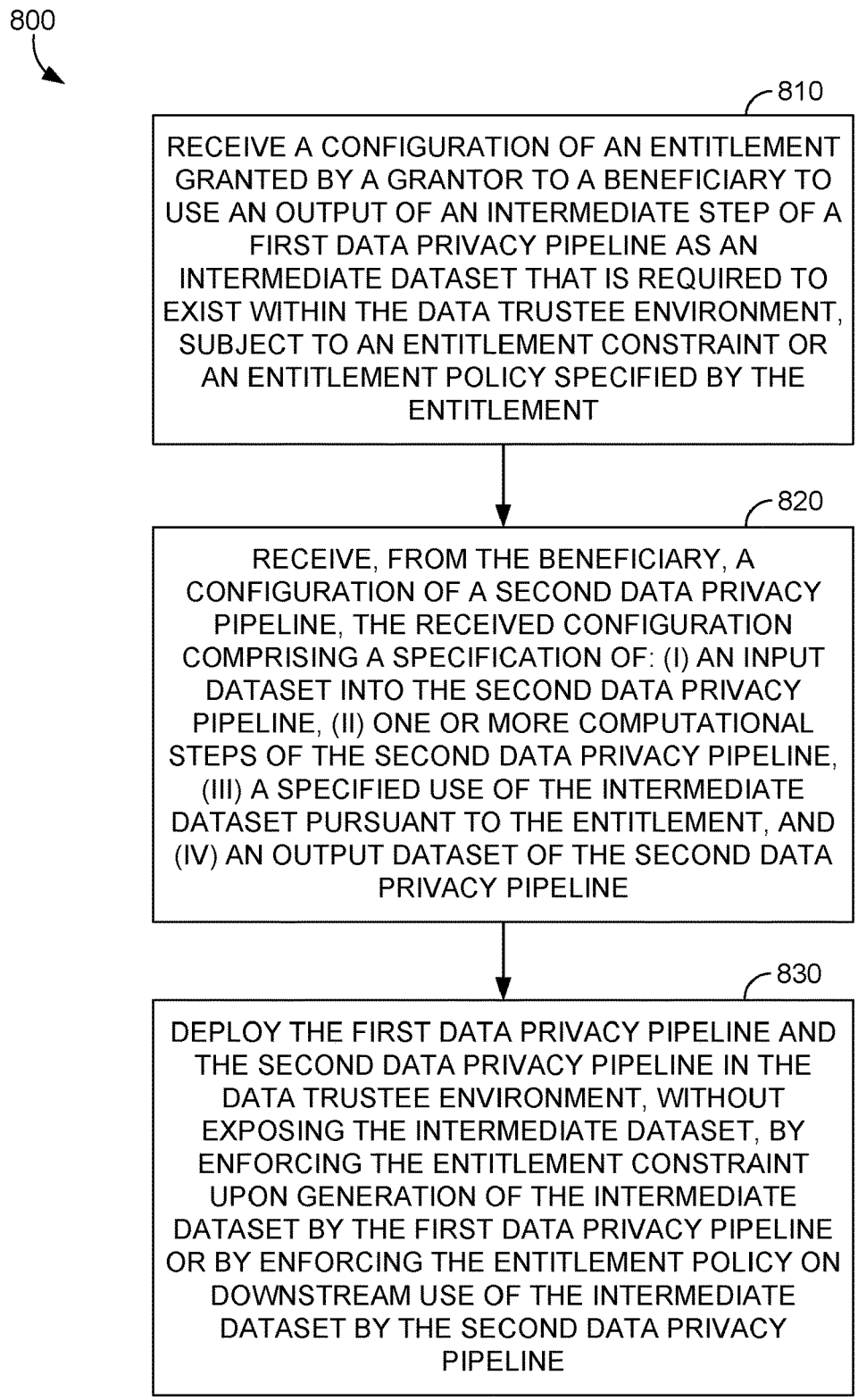
FIG. 8 is a flow diagram showing another example method of enforcing an entitlement, in accordance with embodiments described herein.

Turning now to FIG. 8, a flow diagram is provided showing an example method 800 of enforcing an entitlement, in accordance with embodiments described herein. The method can be performed using the collaborative intelligence environment described herein. For example, in some embodiments, one or more computer storage media having computer-executable instructions embodied thereon can, when executed by one or more processors, cause the one or more processors to perform the methods in the collaborative intelligence environment.

Initially at block 810, a configuration of an entitlement is received. The entitlement is granted by a grantor to a beneficiary to use an output of an intermediate step of a first data privacy pipeline as an intermediate dataset that is required to exist within the data trustee environment, subject to an entitlement constraint or an entitlement policy specified by the entitlement. At block 820, a configuration of a second data privacy pipeline received from the beneficiary. The received configuration includes a specification of: (i) an input dataset into the second data privacy pipeline, (ii) one or more computational steps of the second data privacy pipeline, (iii) a specified use of the intermediate dataset pursuant to the entitlement, and (iv) an output dataset of the second data privacy pipeline. At block 830, the first data privacy pipeline and the second data privacy pipeline are deployed in the data trustee environment, without exposing the intermediate dataset, by enforcing the entitlement constraint upon generation of the intermediate dataset by the first data privacy pipeline or by enforcing the entitlement policy on downstream use of the intermediate dataset by the second data privacy pipeline.

Figure 9:
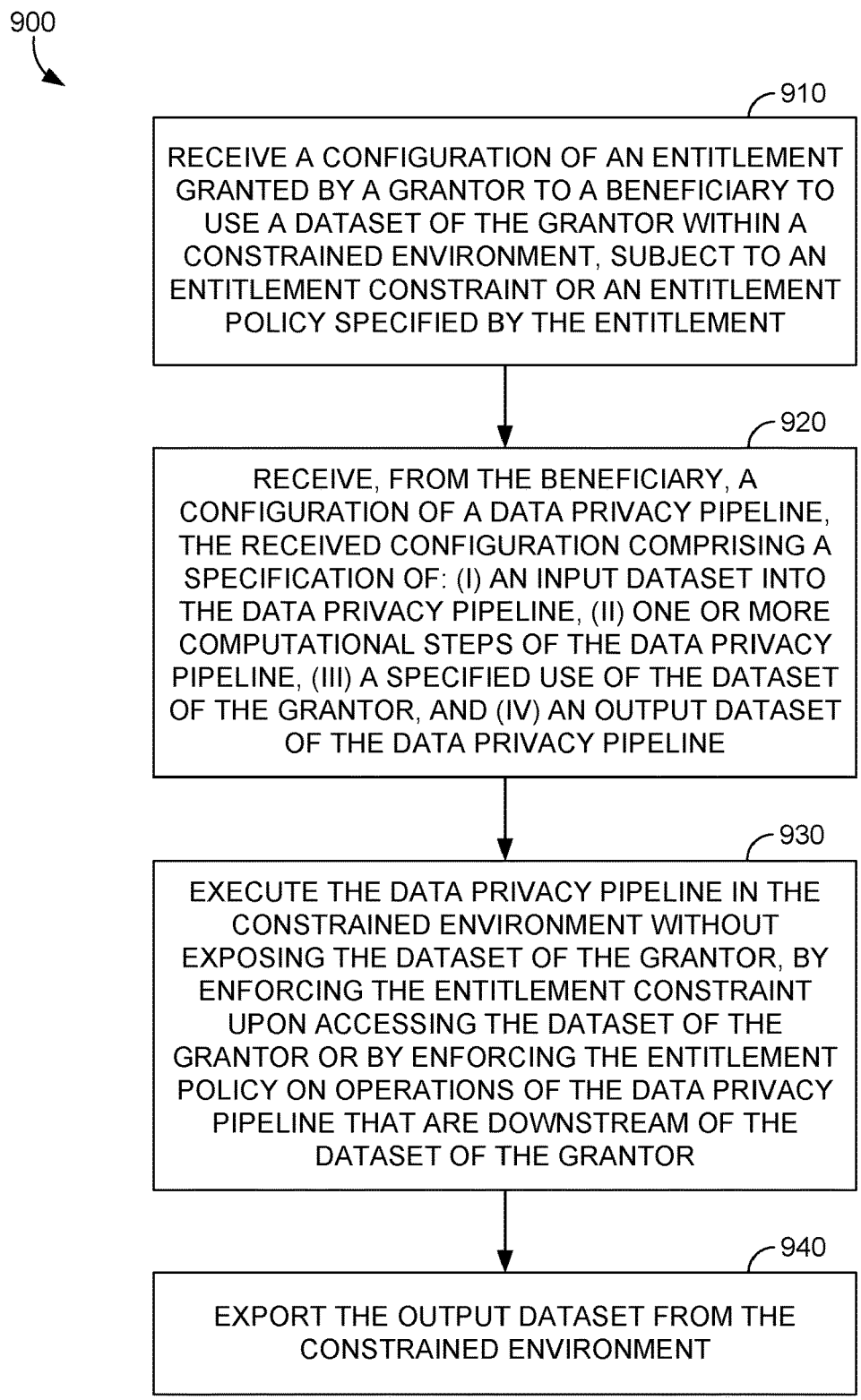
FIG. 9 is a flow diagram showing another example method of enforcing an entitlement, in accordance with embodiments described herein.

Turning now to FIG. 9, a flow diagram is provided showing an example method 900 of enforcing an entitlement, in accordance with embodiments described herein. The method can be performed using the collaborative intelligence environment described herein. For example, in some embodiments, one or more computer storage media having computer-executable instructions embodied thereon can, when executed by one or more processors, cause the one or more processors to perform the methods in the collaborative intelligence environment.

Initially at block 910, a configuration of an entitlement is received. The entitlement is granted by a grantor to a beneficiary to use a dataset of the grantor within a constrained environment, subject to an entitlement constraint or an entitlement policy specified by the entitlement. At block 920, a configuration of a data privacy pipeline is received from the beneficiary. The received configuration includes a specification of: (i) an input dataset into the data privacy pipeline, (ii) one or more computational steps of the data privacy pipeline, (iii) a specified use of the dataset of the grantor, and (iv) an output dataset of the data privacy pipeline. At block 930, the data privacy pipeline is executed in the constrained environment without exposing the dataset of the grantor, by enforcing the entitlement constraint upon accessing the dataset of the grantor or by enforcing the entitlement policy on operations of the data privacy pipeline that are downstream of the dataset of the grantor. At block 940, the output dataset is exported from the constrained environment.

Figure 10:
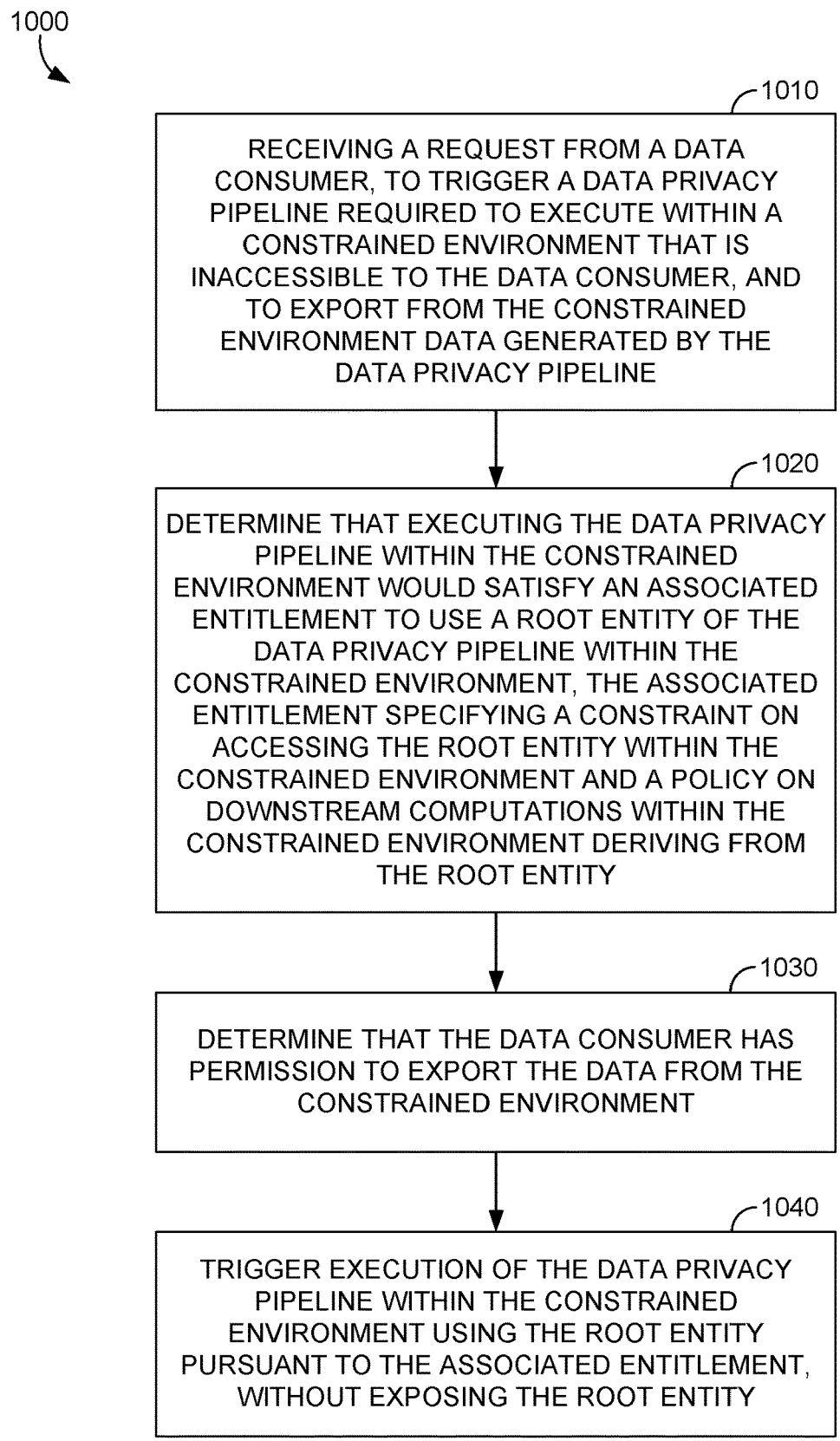
FIG. 10 is a flow diagram showing another example method of enforcing an entitlement, in accordance with embodiments described herein.

Turning now to FIG. 10, a flow diagram is provided showing an example method 1000 of enforcing an entitlement, in accordance with embodiments described herein. The method can be performed using the collaborative intelligence environment described herein. For example, in some embodiments, one or more computer storage media having computer-executable instructions embodied thereon can, when executed by one or more processors, cause the one or more processors to perform the methods in the collaborative intelligence environment.

Initially at block 1010, a request is received from a data consumer. The request is to trigger a data privacy pipeline required to execute within a constrained environment that is inaccessible to the data consumer, and to export from the constrained environment data generated by the data privacy pipeline. At block 1020, a determination is made that executing the data privacy pipeline within the constrained environment would satisfy an associated entitlement to use a root entity of the data privacy pipeline within the constrained environment. The associated entitlement specifies a constraint on accessing the root entity within the constrained environment and a policy on downstream computations within the constrained environment deriving from the root entity. At block 1030, a determination is made that the data consumer has permission to export the data from the constrained environment. At block 1040, the data privacy pipeline is triggered to execute within the constrained environment using the root entity pursuant to the associated entitlement, without exposing the root entity.

Example Collaborative Intelligence Environment

Some embodiments involve techniques for deriving collaborative intelligence based on constraint computing and constraint querying. At a high level, a data trustee can operate a trustee environment configured to derive collaborative intelligence for tenants subject to configurable constraints, without exposing underlying raw data provided by the tenants or collaborative data shielded by the trustee environment. As used herein, collaborative data refers to data that has been derived from shared input data (e.g., data from different users). Shared input data can come from any number of sources (e.g., different users), and can be processed to generate intermediate data, which itself can be processed to generate collaborative data. Collaborative data may include an exposable portion that is allowed to be shared and a restricted portion that is not allowed to be shared. Although the restricted portion of the collaborative data may not be shared, it may include an operable portion that may be used to derive collaborative intelligence that may be shared. In some embodiments, collaborative intelligence may be derived from exposable data and/or restricted data, and the collaborative intelligence may be provided without exposing the restricted data. For example, configurable constraints may programmatically manage limitations (e.g., allowing some operations, but not others) on certain underlying data (e.g., personally identifiable information, some other sensitive information, or any other designated information that is collected, stored, or used) and how the underlying data can and cannot be accessed, used, stored, or displayed (or variations thereof). Further, the configurable constraints may programmatically support collaborative intelligence operations on accessible data (e.g., deriving aggregate statistics), without displaying the individual data entries that were operated on.

By relying on trustee computing to perform data processing, tenants can derive collaborative intelligence from each other's data without compromising data privacy. To accomplish this, the trustee environment can include one or more data privacy pipelines through which data can be ingested, fused, derived, and/or sanitized to generate collaborative data. A data privacy pipeline can be provided as a distributed computing or cloud computing service (cloud service) implemented in the trustee environment, and can be spun up and spun down as needed. In some embodiments, tenants providing data into a data privacy pipeline cannot access the pipeline. Instead, the pipeline outputs collaborative data subject to constraints provided by one or more of the tenants. Depending on the designated constraints, the collaborative data can be output from the trustee environment (e.g., because it has been sanitized according to specified constraints) and/or may be stored in, and shielded by, the trustee environment. Shielded collaborative data can be queried to derive collaborative intelligence subject to the configurable constraints (e.g., without exposing the shielded collaborative data).

Generally, a data privacy pipeline can accept data provided by one or more tenants. Initially, the data privacy pipeline may determine whether input data is joint data pursuant to a contract or other tenant agreement with one or more tenants. Data that is determined to be joint data can be ingested, and data that is determined not to be joint data can be dropped. In this regard, joint data refers to any shared data that is designated for ingestion in generating collaborative data (e.g., a c designated or otherwise identified in a tenant agreement with one more tenants). Ingested data can include data from multiple sources, so the data privacy pipeline may fuse data from multiple sources according to computations and constraints specified in the tenant agreement. For example, constrained data fusion can implement one or more constraints to combine ingested data to form fused joint data in any number of ways, including the use of one or more join operations (e.g., left, right, inner, outer, anti), custom joins (e.g., via imperative scripts), data appends, normalization operations, some combination thereof, and others.

In some embodiments, a data privacy pipeline can perform constrained computations to generate derived joint data. Constrained computing can take data from one source (e.g., ingested data, fused joint data) and perform any number of specified computations (e.g., arithmetic operations, aggregation, summarization, filtering, sorting, bounding). A simple example of a constraint computation is a calculation of average age per city, where the computation is only to be performed for a city if the underlying dataset includes entries for at least five people in the city. Additionally or alternatively, a data privacy pipeline can perform data sanitation to generate collaborative data that implements constraints for storage, access, precision, and the like. For example, data sanitation can implement constraints specified in the tenant agreement designating whether collaborative data should be shielded (e.g., stored in the trustee environment), whether collaborative data can be exported, whether exported collaborative data should be restricted (e.g., do not export email, credit card numbers, portions thereof), and the like. As such, a data privacy pipeline can generate collaborative data from data provided by one or more tenants, and provide agreed-upon access to the collaborative data without sharing the underlying raw data with all the tenants.

In some embodiments, to enable constraint computing and querying, the use and generation of collaborative data in a trustee environment can be monitored and orchestrated subject to configurable constraints. At a high level, constraints can be provided through a user interface to enable tenants (e.g., customers, businesses, users) to specify desired computations and constraints on the use of and access to their data in the trustee environment, including eligible data sources and how their data may be processed or shared. Any number of various types of constraints may be implemented, including data access constraints, data processing constraints, data aggregation constraints, and data sanitation constraints.

For example, data access constraints can be specified to allow or forbid access (e.g., to a specific user, account, organization). In some embodiments, designated constraints can be universal such that the constraints apply to all potential data consumers (e.g., only allow access to average age no matter the data consumer). In some embodiments, a designated constraint can be applied to a designated user, account, organization, and the like (e.g., do not allow group A to access salary data, but allow group B to access it). Generally, a tenant may specify constraints defining how the tenant's data can be merged with designated datasets or portions thereof, constraints limiting the schema of data being read from the tenant's data (e.g., specifying horizontal filtering to be applied to a tenant's data), constraints limiting the size of ingested data (e.g., specifying storage limitations, sub-sampling of the tenant's data, vertical filtering to be applied to a tenant's data), constraints limiting the schema of collaborative data that can be output, constraints defining ownership of collaborative data, constraints defining whether collaborative data should be open, encrypted, or shielded (e.g., stored in the trustee environment), and the like.

In some embodiments, various types of data processing constraints may be designated, such as constraints designating what operations can be performed (e.g., allowable and restricted computations, binary checks), constraints limiting a comparison precision (e.g., for numeric data, geographic data, date and time data), constraints limiting an accumulation precision (e.g., for geographical data, numerical data, date or time data), constraints limiting location bounding precision (e.g., limiting allowable geofencing determinations to specific grids, minimum geographic divisions such as neighborhood, county, city, state, or country, and the like), and other precision and/or data processing requirements.

Additionally or alternatively, one or more data aggregation constraints can be specified, such as constraints requiring a minimum aggregation amount (e.g., at least N rows or distinct field values), constraints requiring some statistical distribution condition to be valid (e.g., minimum standard deviation), constraints defining allowed aggregation functions (e.g., allow min, max, average, but not percentiles), to name a few examples.

In some embodiments, one or more data sanitation constraints can be specified, such as constraints requiring sanitation of personally identifiable information (e.g., remove e-mails, names, IDs, credit card numbers), constraints requiring lower precision sanitation (e.g., lower the numeric, data and time, and/or geographical precision), constraints requiring sanitization of values coming from specific fields (which may entail tracking transformations applied in a data privacy pipeline), constraints requiring custom sanitations (e.g., requiring execution of one or more custom and/or third party sanitation scripts), constraints requiring data masking (e.g., output certain data such as phone numbers, credit cards, dates, but mask a portion of the number), and the like.

Additionally or alternatively to the constraints listed above, one or more constraints can be specified limiting a number of allowable queries and/or data accesses per unit time (e.g., minute, hour, day). Such a constraint can operate to reduce the risk of brute-force attempts to reverse engineer shielded data by asking a set of slightly different questions within a relatively small time window. In general, one or more custom constraints can be specified such as a constraint requiring that some designated property match some designated criteria. These and other types of constraints are contemplated within the present disclosure.

In some embodiments, a constraint manager can monitor and orchestrate data flow, generation, and access, subject to the designated constraints. For example, the constraint manager can communicate with various components in the trustee environment (e.g., a data privacy pipeline) to implement the constraints, which may be maintained in a contract database accessible to the constraint manager. In some embodiments, components can issue requests to the constraint manager for permission to execute a particular command, function call, or other executable unit of logic. The constraint manager can evaluate the request and grant or deny permission. In some cases, permission may be granted subject to one or more conditions corresponding to one or more of the constraints. By way of nonlimiting example, some possible conditions that can be implemented include requiring operations that shift, filter, or reshape data (e.g., application of comparison constraints such as only allowing a merge with certain precision), requiring substitution of one or more executable units of logic (e.g., commands or operations) with one or more constrained executable units of logic (e.g., replace average with constrained average), and the like.

Generally, a constraint can be checked, validated, or otherwise enforced at any time or step (e.g., in association with any portion of a data privacy pipeline, constrained querying). Accordingly, corresponding functionality enforcing a constraint can be applied at any step, or multiple steps. In some embodiments, enforcement of certain constraints can be allocated to certain portions of a data privacy pipeline (e.g., data access constraints get applied during ingestion, processing and aggregation constraints get applied during data fusion and/or constrained computation, sanitation constraints get applied during data sanitation). In another example, a particular data access constraint (e.g., only pass data for patients who participated in at least five different studies) may be applied during data fusion. These are meant merely as examples, and any suitable constraint enforcement regime may be implemented within the present disclosure.

Enforcement of a constraint (e.g., precision or aggregation constraints) on a particular executable unit of logic (e.g., for a designated computation, a requested operation) can result in any number of scenarios. In one example, a particular executable unit of logic can be rejected entirely. In another example, a particular executable unit of logic can be allowed, but the result is filtered (e.g., no value is returned for a particular row or entry of data). In yet another example, a particular executable unit of logic can be allowed, but the result is changed (e.g., precision reduced, a question is answered with false). These and other variations may be implemented.

As constraints are applied to generate collaborative data, any combination of schema, constraints, and/or attribution metadata can be associated with the collaborative data, intermediate data used to arrive at the collaborative data, or otherwise. Generally, constraints can be enforced across multiple steps and computations. As such, in some embodiments, applicable and/or satisfied constraints for each step can be tracked and/or associated with data produced by a given step. Taking aggregation constraints as an example, once an aggregation constraint has been fulfilled during a particular step, subsequent steps no longer need to consider this constraint. In another example where different constraints have been specified for different datasets to be merged, a merging operation may only need to apply the stricter constraint. Generally, an appropriate allocation or combination of constraints can be applied and/or tracked as data flows through a data privacy pipeline. This tracking can facilitate validating whether a particular constraint has been applied to particular data. Accordingly, as constraints are applied and data is generated, corresponding schema, applicable or satisfied constraints, and/or attribution metadata indicating ownership or providence can be associated with a dataset, or a corresponding entry, row, field, or other element of data. In some embodiments, any intermediate data used in arriving at collaborative data (e.g., ingested data, fused joint data, derived joint data) may be deleted, and collaborative data may be stored in the trustee environment and/or provided as an output, depending on an applicable constraint.

In some embodiments, constraint querying can be applied to allow data consumers to query collaborative data in a trustee environment subject to configurable constraints. At a high level, constraint querying can operate as a search engine that allows data consumers to access or derive collaborative intelligence from collaborative data without exposing underlying raw data provided by the tenants or collaborative data shielded by the trustee environment. Constraints can be applied in response to a query in any number of ways, including reformatting a query prior to execution, applying constraints after executing a query, constraining eligible queries for execution, applying access constraints prior to execution, and others.

By way of nonlimiting example, an issued query can be validated against a specified aggregation constraint by ensuring that the query contains at least one aggregation element and ensuring that the aggregation element(s) are consistent the aggregation constraint. In another example, an execution plan corresponding to the issued query can be executed, and the results can be validated against the aggregation constraint and/or the aggregation element(s) of the query (e.g., confirming the results correspond to a requested number of distinct rows, fields, statistical distribution). In some embodiments, a constraint can be enforced on a corresponding element of a query by modifying the element based on the constraint (e.g., to limit a corresponding number of distinct rows, fields, statistical distribution), by executing the modified element prior to the other elements of the query, some combination thereof, or otherwise.

By way of background, queries are generally not executable code. In order to execute a query, it is normally converted into an execution plan that is executable. In some embodiments, in order to enforce constraints on a received query, the query can be parsed into a corresponding execution tree comprising a hierarchical arrangement of executable units of logic that, when executed, implement the query. Applicable constraints can be accessed, and the executable units of logic can be validated against the constraints. In some embodiments, if one or more of the executable units of logic is not allowed, the query can effectively be reformatted by altering one or more of the executable units of logic based on one or more constraints. More specifically, the execution tree corresponding to the query can be reformatted into a constrained execution tree by traversing the execution tree and replacing executable units of logic inconsistent with a particular constraint with custom executable units of logic that are consistent with the constraint. Additionally or alternatively, one or more executable units of logic may be added to the constrained execution tree to enforce constraints (e.g., precision constraints) on the output. These are simply meant as examples, and any suitable technique for generating a constrained execution tree can be implemented.

Generally, an executable unit of logic of an execution tree can be validated against a corresponding constraint context comprising an applicable accessed constraint and runtime information such as information identifying the requesting data consumer issuing the query, information identifying an applicable tenant agreement, information identifying target collaborative data on which to operate, and the like. Validation of an executable unit of logic can involve validation of a constituent command or operation, one or more constituent parameters, and/or consideration of other parts of the execution tree. Validation of an executable unit of logic can result in a number of possible results. For example, an executable unit of logic can be allowed (e.g., the executable unit of logic can be copied into a constrained execution tree), an executable unit of logic can be disallowed (e.g., the query can be disallowed in its entirety), or an executable unit of logic can be allowed but with changes (e.g., copying a corresponding constrained executable unit of logic into the constrained execution tree). In some embodiments, the resulting constrained execution tree is translated into a language used by the trustee environment. The resulting execution tree can be executed (e.g., by traversing and executing the hierarchy of executable units of logic of the tree), and the results can be returned to the requesting data consumer.

As such, using implementations described herein, users can efficiently and effectively share data through a data trustee that allows them derive collaborative intelligence, while ensuring data privacy and providing configurable control and access to shared data. Related techniques are described in U.S. patent application Ser. No. 16/736,399, filed on Jan. 7, 2020, entitled "Multi-Participant and Cross-Environment Pipelines," U.S. patent application Ser. No. 16/665,916, filed on Oct. 28, 2019, entitled "User Interface for Building a Data Privacy Pipeline and Contractual Agreement to Share Data," and U.S. patent application Ser. No. 16/388,696, filed on Apr. 18, 2019, entitled "Data Privacy Pipeline Providing Collaborative Intelligence And Constraint Computing," the contents of each of which are herein incorporated by reference in their entirety.

Example Distributed Computing Environment

Figure 11:
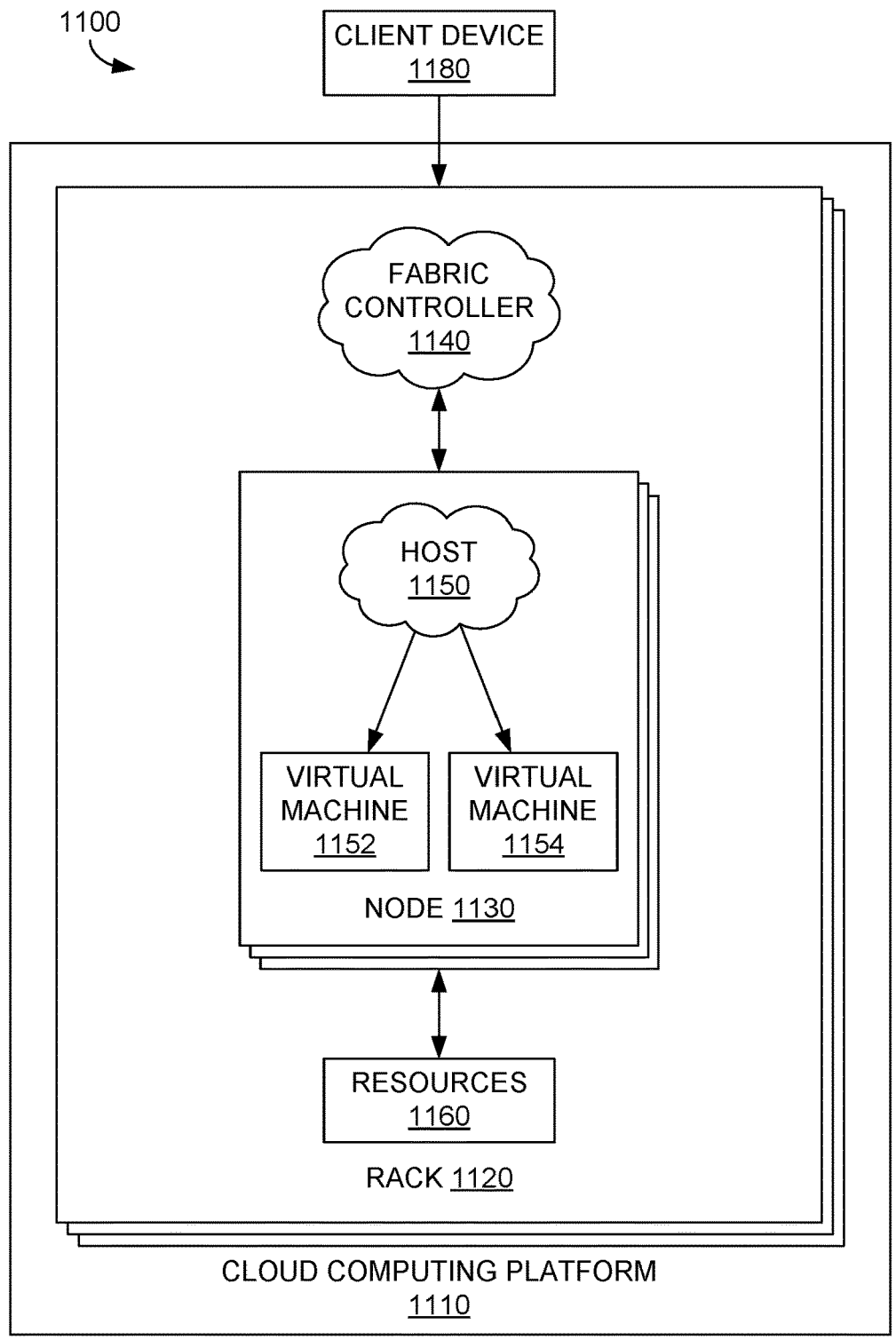
FIG. 11 is a block diagram of an example computing environment suitable for use in implementing embodiments described herein.

Referring now to FIG. 11, FIG. 11 illustrates an example distributed computing environment 1100 in which implementations of the present disclosure may be employed. In particular, FIG. 11 shows a high level architecture of an example cloud computing platform 1110 that can host a collaborative intelligence environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 1100 that includes cloud computing platform 1110, rack 1120, and node 1130 (e.g., computing devices, processing units, or blades) in rack 1120. The collaborative intelligence environment and/or data trustee environment can be implemented with cloud computing platform 1110 that runs cloud services across different data centers and geographic regions. Cloud computing platform 1110 can implement fabric controller 1140 component for provisioning and managing resource allocation, deployment, upgrade, and management of cloud services. Typically, cloud computing platform 1110 acts to store data or run service applications in a distributed manner. Cloud computing infrastructure 1110 in a data center can be configured to host and support operation of endpoints of a particular service application. Cloud computing infrastructure 1110 may be a public cloud, a private cloud, or a dedicated cloud.

Node 1130 can be provisioned with host 1150 (e.g., operating system or runtime environment) running a defined software stack on node 1130. Node 1130 can also be configured to perform specialized functionality (e.g., compute nodes or storage nodes) within cloud computing platform 1110. Node 1130 is allocated to run one or more portions of a service application of a tenant. A tenant can refer to a customer utilizing resources of cloud computing platform 1110. Service application components of cloud computing platform 1110 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 1130, nodes 1130 may be partitioned into virtual machines (e.g., virtual machine 1152 and virtual machine 1154). Physical machines can also concurrently run separate service applications. The virtual machines or physical machines can be configured as individualized computing environments that are supported by resources 1160 (e.g., hardware resources and software resources) in cloud computing platform 1110. It is contemplated that resources can be configured for specific service applications. Further, each service application may be divided into functional portions such that each functional portion is able to run on a separate virtual machine. In cloud computing platform 1110, multiple servers may be used to run service applications and perform data storage operations in a cluster. In particular, the servers may perform data operations independently but exposed as a single device referred to as a cluster. Each server in the cluster can be implemented as a node.

Client device 1180 may be linked to a service application in cloud computing platform 1110. Client device 1180 may be any type of computing device, which may correspond to computing device 1200 described with reference to FIG. 12, for example. Client device 1180 can be configured to issue commands to cloud computing platform 1110. In embodiments, client device 1180 may communicate with service applications through a virtual Internet Protocol (IP) and load balancer or other means that direct communication requests to designated endpoints in cloud computing platform 1110. The components of cloud computing platform 1110 may communicate with each other over a network (not shown), which may include, without limitation, one or more local area networks (LANs) and/or wide area networks (WANs).

Example Operating Environment

Figure 12:
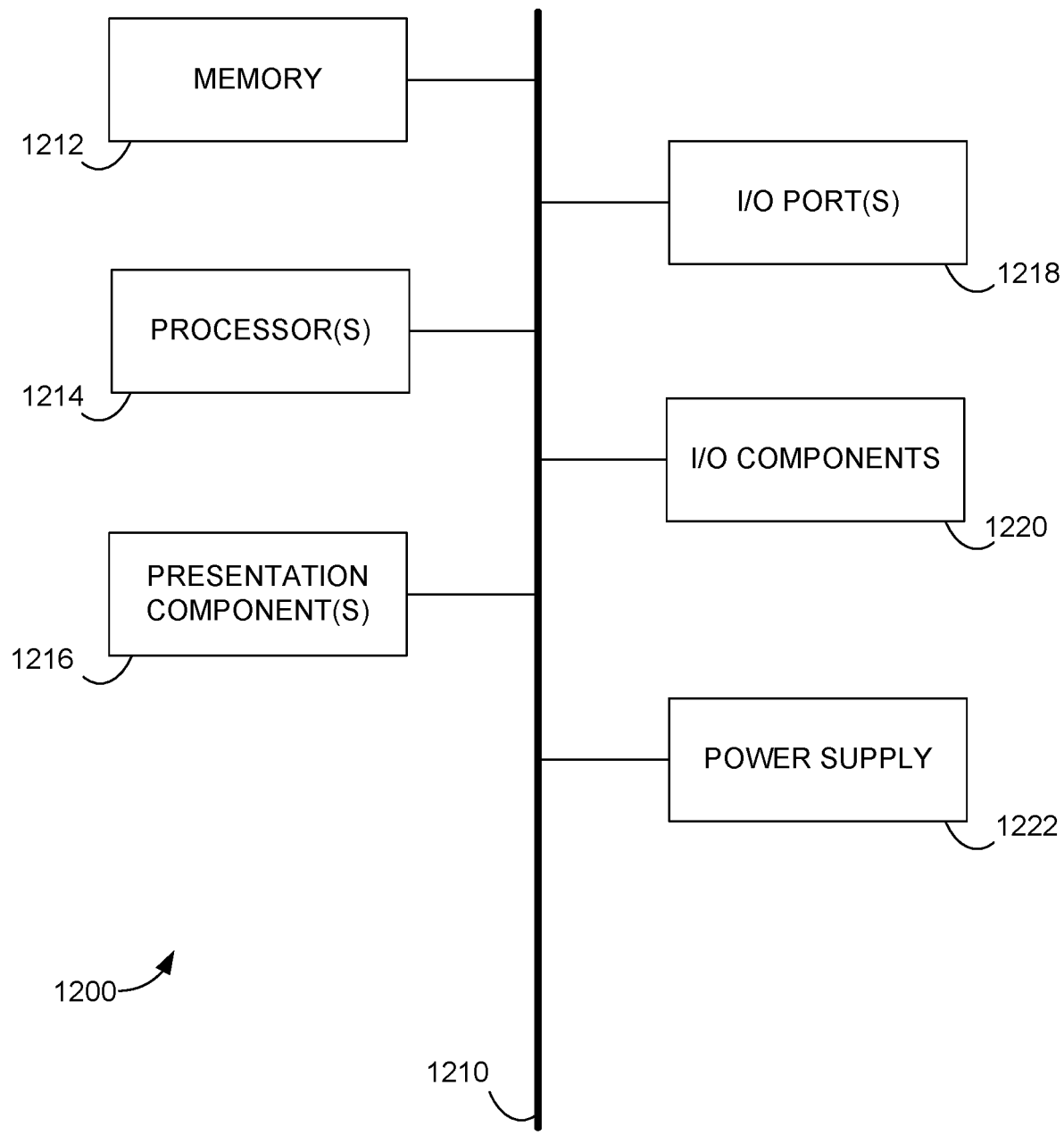
FIG. 12 is a block diagram of an example computing environment suitable for use in implementing embodiments described herein.

Having briefly described an overview of embodiments of the present invention, an example operating environment in which embodiments of the present invention may be implemented is described below in order to provide a general context for various aspects of the present invention. Referring initially to FIG. 12 in particular, an example operating environment for implementing embodiments of the present invention is shown and designated generally as computing device 1200. Computing device 1200 is but one example of a suitable computing environment and is not intended to suggest any limitation as to the scope of use or functionality of the invention. Neither should computing device 1200 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 12, computing device 1200 includes bus 1210 that directly or indirectly couples the following devices: memory 1212, one or more processors 1214, one or more presentation components 1216, input/output ports 1218, input/output components 1220, and illustrative power supply 1222. Bus 1210 represents what may be one or more buses (such as an address bus, data bus, or combination thereof). The various blocks of FIG. 12 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 12 is merely illustrative of an example computing device that can be used in connection with one or more embodiments of the present invention. Distinction is not made between such categories as "workstation," "server," "laptop," "hand-held device," etc., as all are contemplated within the scope of FIG. 12 and reference to "computing device."

Computing device 1200 typically includes a variety of computer-readable media. Computer-readable media can be any available media that can be accessed by computing device 1200 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1212 includes computer storage media in the form of volatile and/or nonvolatile memory. The memory may be removable, non-removable, or a combination thereof. Exemplary hardware devices include solid-state memory, hard drives, optical-disc drives, etc. Computing device 1200 includes one or more processors that read data from various entities such as memory 1212 or I/O components 1220. Presentation component(s) 1216 present data indications to a user or other device. Exemplary presentation components include a display device, speaker, printing component, vibrating component, etc.

I/O ports 1218 allow computing device 1200 to be logically coupled to other devices including I/O components 1220, some of which may be built in. Illustrative components include a microphone, joystick, game pad, satellite dish, scanner, printer, wireless device, etc.

With reference to the collaborative intelligence environment described herein, embodiments described herein support constraint computing and/or constraint querying. The components of the collaborative intelligence environment can be integrated components that include a hardware architecture and a software framework that support constraint computing and/or constraint querying functionality within a collaborative intelligence system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the collaborative intelligence system can include an API library that includes specifications for routines, data structures, object classes, and variables may support the interaction between the hardware architecture of the device and the software framework of the collaborative intelligence system. These APIs include configuration specifications for the collaborative intelligence system such that the different components therein can communicate with each other in the collaborative intelligence system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the collaborative intelligence environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A data trustee platform comprising:
one or more computer storage media storing computer-useable instructions that, when executed by one or more computing devices, cause the one or more computing devices to perform operations comprising:
managing a contracts database that stores definitions of collaboration contracts among tenants of the data trustee platform, entitlements associated with the collaboration contracts, and data pipelines associated with the collaboration contracts; and updating the contracts database, based on input from a first tenant of the tenants that is a beneficiary of a plurality of the entitlements to use a plurality of shielded assets in the data trustee platform, to include a definition of a data pipeline that chains the plurality of the entitlements and is configured to generate derived data in the data trustee platform without exposing the plurality of shielded assets to the first tenant.

2. The data trustee platform of claim 1, wherein the data pipeline includes constituent pipelines and constituent entitlements, and the definition of the data pipeline represents the data pipeline as a single master pipeline.

3. The data trustee platform of claim 1, wherein the data pipeline includes constituent pipelines and constituent entitlements, and the definition of the data pipeline represents the data pipeline as a collection of the constituent pipelines and constituent entitlements.

4. The data trustee platform of claim 1, the operations further comprising executing, based on a triggering input from the first tenant, the data pipeline in the data trustee platform to generate the derived data in the data trustee platform without exposing the plurality of shielded assets to the first tenant.

5. The data trustee platform of claim 1, the operations further comprising updating the contracts database, based on further input from the first tenant, to include a new definition of a new entitlement to a second tenant of the tenants to execute the data pipeline in the data trustee platform without exposing the plurality of shielded assets to the second tenant.

6. The data trustee platform of claim 1, wherein the definitions designate that the plurality of shielded assets are owned by different tenants of the tenants, the plurality of the entitlements are granted from the different tenants to the first tenant, and the data pipeline chains the plurality of shielded assets that are owned by the different tenants.

7. The data trustee platform of claim 1, wherein the plurality of shielded assets includes an input dataset or computational script owned by a particular one of the tenants that is not authorized to trigger execution of the data pipeline.

8. The data trustee platform of claim 1, wherein the plurality of shielded assets includes an intermediate dataset configured to be generated by an upstream data pipeline of the data pipelines, and the plurality of the entitlements authorize the first tenant to trigger execution of the upstream data pipeline to generate and pass the intermediate dataset to the data pipeline in the data trustee platform without exposing the intermediate dataset to the first tenant.

9. One or more computer storage media storing computer-useable instructions that, when executed by one or more computing devices, cause the one or more computing devices to perform operations comprising:
managing a contracts database that stores definitions of collaboration contracts among tenants of a data trustee platform, entitlements associated with the collaboration contracts, and data pipelines associated with the collaboration contracts; and
updating the contracts database, based on input from a first tenant of the tenants that is a beneficiary of a plurality of the entitlements to use a plurality of shielded assets in the data trustee platform, to include a definition of a data pipeline that chains the plurality of the entitlements and is configured to generate derived data in the data trustee platform without exposing the plurality of shielded assets to the first tenant.

10. The one or more computer storage media of claim 9, wherein the data pipeline includes constituent pipelines and constituent entitlements, and the definition of the data pipeline represents the data pipeline as a single master pipeline.

11. The one or more computer storage media of claim 9, wherein the data pipeline includes constituent pipelines and constituent entitlements, and the definition of the data pipeline represents the data pipeline as a collection of the constituent pipelines and constituent entitlements.

12. The one or more computer storage media of claim 9, the operations further comprising executing, based on a triggering input from the first tenant, the data pipeline in the data trustee platform to generate the derived data in the data trustee platform without exposing the plurality of shielded assets to the first tenant.

13. The one or more computer storage media of claim 9, the operations further comprising updating the contracts database, based on further input from the first tenant, to include a new definition of a new entitlement to a second tenant of the tenants to execute the data pipeline in the data trustee platform without exposing the plurality of shielded assets to the second tenant.

14. The one or more computer storage media of claim 9, wherein the definitions designate that the plurality of shielded assets are owned by different tenants of the tenants, the plurality of the entitlements are granted from the different tenants to the first tenant, and the data pipeline chains the plurality of shielded assets that are owned by the different tenants.

15. The one or more computer storage media of claim 9, wherein the plurality of shielded assets includes an input dataset or computational script owned by a particular one of the tenants that is not authorized to trigger execution of the data pipeline.

16. The one or more computer storage media of claim 9, wherein the plurality of shielded assets includes an intermediate dataset configured to be generated by an upstream data pipeline of the data pipelines, and the plurality of the entitlements authorize the first tenant to trigger execution of the upstream data pipeline to generate and pass the intermediate dataset to the data pipeline in the data trustee platform without exposing the intermediate dataset to the first tenant.

17. A method comprising:
managing a contracts database that stores definitions of collaboration contracts among tenants of a data trustee platform, entitlements associated with the collaboration contracts, and data pipelines associated with the collaboration contracts; and
updating the contracts database, based on input from a first tenant of the tenants that is a beneficiary of a plurality of the entitlements to use a plurality of shielded assets in the data trustee platform, to include a definition of a data pipeline that chains the plurality of the entitlements and is configured to generate derived data in the data trustee platform without exposing the plurality of shielded assets to the first tenant.

18. The method of claim 17, further comprising executing, based on a triggering input from the first tenant, the data pipeline in the data trustee platform to generate the derived data in the data trustee platform without exposing the plurality of shielded assets to the first tenant.

19. The method of claim 17, further comprising updating the contracts database, based on further input from the first tenant, to include a new definition of a new entitlement to a second tenant of the tenants to execute the data pipeline in the data trustee platform without exposing the plurality of shielded assets to the second tenant.

20. The method of claim 17, wherein the plurality of shielded assets includes an intermediate dataset configured to be generated by an upstream data pipeline of the data pipelines, and the plurality of the entitlements authorize the first tenant to trigger execution of the upstream data pipeline to generate and pass the intermediate dataset to the data pipeline in the data trustee platform without exposing the intermediate dataset to the first tenant.

* * * * *